US007813709B2

(12) United States Patent
Yamamoto et al.

(10) Patent No.: US 7,813,709 B2

(45) Date of Patent: Oct. 12, 2010

(54) MIMO ANTENNA APPARATUS PROVIDED WITH VARIABLE IMPEDANCE LOAD ELEMENT CONNECTED TO PARASITIC ELEMENT

(75) Inventors: Atsushi Yamamoto, Kyoto (JP); Hiroshi Iwai, Osaka (JP); Tsutomu Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 502 days.

(21) Appl. No.: 11/889,742

(22) Filed: Aug. 16, 2007

(65) Prior Publication Data

US 2008/0062065 A1 Mar. 13, 2008

(30) Foreign Application Priority Data

Aug. 16, 2006 (JP) ............................ 2006-221852

(51) Int. Cl.
*H04M 1/00* (2006.01)
*H01Q 21/00* (2006.01)

(52) U.S. Cl. .................... 455/272; 455/562.1; 343/893; 343/833

(58) Field of Classification Search ................ 455/63.4, 455/132, 137, 269, 272, 273, 276.1, 277.1, 455/277.2, 550.1, 562.1; 343/833, 844, 893, 343/912
See application file for complete search history.

(56) References Cited

U.S. PATENT DOCUMENTS 7,034,759 B2 * 4/2006 Proctor et al. ............... 343/725
7,379,759 B2 * 5/2008 Nakaya et al. ........... 455/562.1
7,522,552 B2 * 4/2009 Fein et al. ................... 370/328
7,528,789 B2 * 5/2009 Gothard et al. ............. 343/834
7,620,424 B2 * 11/2009 Cetiner et al. ........... 455/562.1
2003/0232633 A1 * 12/2003 Iida et al. ................. 455/575.7
2004/0192394 A1 * 9/2004 Nakaya et al. ........... 455/562.1
2005/0037822 A1 * 2/2005 Regnier et al. ........... 455/575.5
2007/0224949 A1 * 9/2007 Morton et al. .............. 455/101

FOREIGN PATENT DOCUMENTS

JP 2003-87051 3/2003
JP 2004-312381 11/2004

* cited by examiner

*Primary Examiner*—Blane J Jackson
(74) *Attorney, Agent, or Firm*—Wenderoth, Lind & Ponack, L.L.P.

(57) ABSTRACT

A MIMO antenna apparatus includes a plurality of feeding antenna elements, a parasitic element electromagnetically coupled to each feeding antenna element, and a variable impedance load element connected to the parasitic element. A signal level comparator circuit detects received signal levels of received wireless signals and compares the received signal levels with each other, and thus detects the minimum received signal level. A controller controls an impedance value of the variable impedance load element based on the received signal levels detected by the signal level comparator circuit, such that the received signal level of the wireless signal having the minimum received signal level is substantially maximized.

11 Claims, 14 Drawing Sheets

MIMO ANTENNA APPARATUS PROVIDED WITH VARIABLE IMPEDANCE LOAD ELEMENT CONNECTED TO PARASITIC ELEMENT

BACKGROUND OF THE INVENTION

1. Field of the Invention

The present invention relates to an antenna apparatus for use in a wireless communication apparatus which is controlled so as to achieve high-speed communication with increased communication capacity as well as to maintain high communication quality in mobile communication using a mobile phone or the like. More particularly, the present invention relates to a MIMO antenna apparatus and a wireless communication apparatus provided with the MIMO antenna apparatus.

2. Description of the Related Art

For an antenna apparatus adopting MIMO (Multi-Input Multi-Output) technique for simultaneously transmitting and/or receiving wireless signals in a plurality of channels using a plurality of antennas, there is a MIMO antenna apparatus disclosed in, for example, Japanese Patent Laid-Open Publication No. 2004-312381.

The MIMO antenna apparatus disclosed in the Japanese Patent Laid-Open Publication No. 2004-312381 includes four groups of antenna elements, each group equally spaced from the adjacent one, and a main body unit. Each group of antenna elements includes four antenna elements with different polarization directions. The main body unit includes: a switch unit connected to the respective antenna elements; a signal receiving unit for receiving received signals through the switch unit; an antenna controlling unit for generating a control signal for the switch unit; an antenna selecting unit for generating combinations of antenna elements and providing selected-element information to the antenna controlling unit; and an antenna determining unit for determining a specific combination of antenna elements based on received signals received by the antenna elements generated by the antenna selecting unit and providing determined-element information to the antenna controlling unit. This conventional MIMO antenna apparatus aims to, by means of such configuration, reduce a correlation between antenna elements to ensure sufficient transmission capacity, by determining combinations of antenna elements such that one antenna element is selected from each group of antenna elements.

Namely, in the MIMO antenna apparatus, if a plurality of antenna elements operate at the same time and each antenna element achieves the highest possible receiving power, it leads to an increased total transmission rate of a plurality of signal sequences after MIMO demodulation. The MIMO antenna apparatus disclosed in the Japanese Patent Laid-Open Publication No. 2004-312381 achieves the increased total transmission rate by providing it with a larger number of antenna elements than the number of MIMO simultaneous communication channels, selecting therefrom antenna elements having a higher receiving signal strength, and performing MIMO demodulation using the selected antenna elements. Such selection of antenna elements is particularly effective for the case of mobile communication, in which there are temporal variations in the signal strengths of principal polarization and cross polarization, or changes in the angle of arrival, due to the movement of a mobile station (user) or temporal changes in the surrounding environment. In addition, it is possible to cope with changes in polarization directions by using antenna elements with different polarization characteristics, overcome temporal variations by performing a control for switching antenna elements.

As described above, the MIMO antenna apparatus disclosed in the Japanese Patent Laid-Open Publication No. 2004-312381 is provided with a plurality of groups of antenna elements, each group including a plurality of antenna elements, and can select a combination of antenna elements with the lowest correlations or a combination of antenna elements with the highest transmission capacity by using a switch unit, to reduce the correlations between the antenna elements, thereby improving transmission capacity.

Furthermore, with reference to the Japanese Patent Laid-Open Publication No. 2003-87051, an example of an adaptive antenna apparatus including parasitic elements and variable impedance load elements will be described.

An adaptive antenna apparatus disclosed in the Japanese Patent Laid-Open Publication No. 2003-87051 has a structure in which the apparatus includes one feeding antenna element (referred to as "radiating element" in the Japanese Patent Laid-Open Publication No. 2003-87051), and a plurality of parasitic elements (referred to as "parasitic elements" in the Japanese Patent Laid-Open Publication No. 2003-87051) disposed around the feeding antenna element. Furthermore, to each parasitic element is connected a variable reactance element as a variable impedance load element. Each parasitic element is electromagnetically coupled to the feeding antenna element. By controlling reactance values of the variable reactance elements by an adaptive control type controller, a radiation directivity of the adaptive antenna apparatus can be changed. By means of such configuration, the apparatus aims to receive only a desired wave by suppressing interference waves arriving at a wireless transmitter/receiver. Thus, according to the adaptive antenna apparatus disclosed in the Japanese Patent Laid-Open Publication No. 2003-87051, it can be expected to control the directivity to achieve high quality wireless communication, by means of the feeding antenna element, the plurality of parasitic elements, and the variable reactance elements.

Furthermore, according to the adaptive antenna apparatus disclosed in the Japanese Patent Laid-Open Publication No. 2003-87051, it is possible to configure an adaptive antenna apparatus with one wireless communication circuit (e.g., a wireless transmitter/receiver circuit). In a portable wireless communication apparatus that operates by a rechargeable battery, particularly, including a mobile phone etc., a configuration with low power consumption is required so that the longest possible talk-time can be achieved. A standard adaptive antenna apparatus requires wireless communication circuits whose number is equal to the number of antenna elements, and thus requires high power consumption. However, according to the configuration described in the Japanese Patent Laid-Open Publication No. 2003-87051, an adaptive antenna apparatus is implemented with one wireless communication circuit (described as "demodulator" in the Japanese Patent Laid-Open Publication No. 2003-87051) by employing the control of the parasitic elements. Accordingly, both low power consumption and a small-sized configuration can be achieved.

As described above, the adaptive antenna apparatus disclosed in the Japanese Patent Laid-Open Publication No. 2003-87051 is configured with the feeding antenna element, the plurality of parasitic elements, and the variable reactance elements, and the adaptive antenna apparatus controls the variable reactance elements by the adaptive control type controller to change the directivity of the adaptive antenna apparatus, thus suppressing interference waves and controlling the directivity such that a beam is formed in a direction of a desired wave. Accordingly, an adaptive antenna apparatus enabling high quality wireless transmission can be provided.

The MIMO antenna apparatus disclosed in the Japanese Patent Laid-Open Publication No. 2004-312381 has the following problem. This conventional MIMO antenna apparatus includes, as described above, a larger number of antenna elements than the number of MIMO simultaneous communication channels, selects therefrom antenna elements having a higher received signal strength, and performs MIMO demodulation using the selected antenna elements, in order to achieve the highest possible received power. However, it is extremely difficult to mount a plurality of groups of antenna elements such as those described in the Japanese Patent Laid-Open Publication No. 2004-312381 on a small-sized device with a size of one wavelength or less, such as a mobile phone.

On the other hand, the adaptive antenna apparatus disclosed in the Japanese Patent Laid-Open Publication No. 2003-87051 has the following problem. This conventional adaptive antenna apparatus achieves a small-sized configuration by employing one feeding antenna element, and thus can be mounted on a small-sized device with a size of one wavelength or less, such as a mobile phone. However, since there is only one feeding antenna element, it is impossible to apply the adaptive antenna apparatus to a MIMO antenna apparatus that controls the directivity of each of a plurality of antenna elements for each of a plurality of transmitter circuits (or a plurality of receiver circuits). Namely, even if two feeding antenna elements are provided to the adaptive antenna apparatus disclosed in the Japanese Patent Laid-Open Publication No. 2003-87051, these two feeding antenna elements are electromagnetically coupled to all of the parasitic elements, and thus, even by changing the reactance values of the variable reactance elements, it is impossible to independently change the directivities of the two feeding antenna elements. Accordingly, the adaptive antenna apparatus disclosed in the Japanese Patent Laid-Open Publication No. 2003-87051 cannot be used in a MIMO antenna apparatus.

SUMMARY OF THE INVENTION

An essential object of the present invention is therefore to solve the above-described problems, and provide a MIMO antenna apparatus that can perform, despite its small-sized configuration, MIMO communication with high transmission capacity and high transmission quality by maintaining good receiving conditions at a plurality of feeding antenna elements at the same time, as well as provide a mobile wireless communication apparatus provided with the MIMO antenna apparatus.

In order to achieve the aforementioned objective, according to one aspect of the present invention, a MIMO antenna apparatus is provided that includes a plurality of feeding antenna elements, a demodulator, at least one parasitic element, at least one variable impedance load element, a comparator, and a controller. The plurality of feeding antenna elements respectively receives a plurality of wireless signals. The demodulator demodulates the wireless signals received by the plurality of feeding antenna elements, by a MIMO method. The at least one parasitic element is provided to be electromagnetically coupled to each of the feeding antenna elements, and the at least one variable impedance load element is connected to the parasitic element. The comparator detects a received signal level of each of the wireless signals received by the feeding antenna elements and compares the received signal levels with each other, thereby detecting the minimum received signal level. The controller controls an impedance value of the variable impedance load element based on the received signal levels detected by the comparator, such that the received signal level of the wireless signal having the minimum received signal level is substantially maximized.

In the MIMO antenna apparatus, the comparator further detects the received signal level smaller than a predetermined first threshold value. Further, the controller controls the impedance value of the variable impedance load element based on the received signal levels detected by the comparator, such that the received signal level of the wireless signal having the minimum received signal level among wireless signals having the detected received signal level smaller than the first threshold value is substantially maximized.

Moreover, in the MIMO antenna apparatus, the comparator further compares the received signal level of each of the wireless signals with a predetermined first threshold value, and when the received signal levels of all of the wireless signals are larger than or equal to the first threshold value, the comparator compares a signal level difference between the maximum received signal level and the minimum received signal level with a predetermined second threshold value. When the signal level difference is larger than or equal to the second threshold value, the controller further controls the impedance value of the variable impedance load element based on the received signal levels detected by the comparator, such that the received signal level of the wireless signal having the minimum received signal level is substantially maximized.

Furthermore, the MIMO antenna apparatus includes a wireless transmitter for wirelessly transmitting a control signal to a sender-side wireless station apparatus which transmits the plurality of wireless signals, the control signal controlling a communication method used by the sender-side wireless station apparatus. Further, the comparator compares the received signal level of each of the wireless signals with a predetermined first threshold value, and when the received signal levels of all of the wireless signals are smaller than the first threshold value, the comparator detects the maximum received signal level. When the received signal levels of all of the wireless signals are smaller than the first threshold value, the controller further controls the sender-side wireless station apparatus by making the wireless transmitter transmit the control signal and controls the MIMO demodulator, so as to change communication method used by each of the sender-side wireless station apparatus and the MIMO demodulator from a MIMO method to a SISO (Single-Input Single-Output) method; and the controller controls the impedance value of the variable impedance load element based on the received signal level detected by the comparator, such that the received signal level of the wireless signal having the maximum received signal level is substantially maximized.

Moreover, the MIMO antenna apparatus further includes a wireless transmitter for wirelessly transmitting a control signal to a sender-side wireless station apparatus which transmits the plurality of wireless signals, the control signal controlling a communication method used by the sender-side wireless station apparatus. Further, the comparator compares the received signal level of each of the wireless signals with a predetermined first threshold value, and when the received signal levels of all of the wireless signals are larger than or equal to the first threshold value, the comparator compares a signal level difference between the maximum received signal level and the minimum received signal level with a predetermined second threshold value, and when the received signal levels of all of the wireless signals are smaller than the first threshold value, the comparator detects the maximum received signal level. When the received signal level of at least one wireless signal is smaller than the first threshold value and the received signal level of at least one wireless signal is larger than or equal to the first threshold value, the controller further controls the impedance value of the variable impedance load element based on the received signal levels detected by the comparator, such that the received signal level of the wireless signal having the minimum received signal level among wireless signals having the detected received signal level smaller than the first threshold value is substantially maximized. When the received signal levels of all of the wireless signals are larger than or equal to the first threshold value and the signal level difference between the maximum received signal level and the minimum received signal level is larger than or equal to the second threshold value, the controller further controls the impedance value of the variable impedance load element based on the received signal levels detected by the comparator, such that the received signal level of the wireless signal having the minimum received signal level is substantially maximized. When the received signal levels of all of the wireless signals are smaller than the first threshold value, the controller further controls the sender-side wireless station apparatus by making the wireless transmitter transmit the control signal and controls the MIMO demodulator, so as to change communication method used by each of the sender-side wireless station apparatus and the MIMO demodulator from a MIMO method to a SISO method; and the controller controls the impedance value of the variable impedance load element based on the received signal level detected by the comparator, such that the received signal level of the wireless signal having the maximum received signal level is substantially maximized.

Furthermore, in the MIMO antenna apparatus, in the case that the communication method used by each of the sender-side wireless station apparatus and the MIMO demodulator are changed from the MIMO method to the SISO method, when the received signal levels of all of the wireless signals have become larger than or equal to the first threshold value by controlling the impedance value of the variable impedance load element, or when a predetermined fixed control time has elapsed, the controller further controls the sender-side wireless station apparatus by making the wireless transmitter transmit the control signal and controls the MIMO demodulator, so as to change the communication method used by each of the sender-side wireless station apparatus and the MIMO demodulator from the SISO method to the MIMO method.

Moreover, in the MIMO antenna apparatus, the variable impedance load element has an impedance value which continuously changes according to control of the controller.

Furthermore, in the MIMO antenna apparatus, the variable impedance load element has a plurality of impedance values which are selectively changed according to control of the controller.

Moreover, the MIMO antenna apparatus further includes a wireless communication circuit for receiving or transmitting a certain wireless signal; and a switch for connecting either one of the variable impedance load element and the wireless communication circuit to the parasitic element.

According to another aspect of the present invention, the wireless communication apparatus has a MIMO antenna apparatus indluding a plurality of feeding antenna elements, a demodulator, at least one parasitic element, at least one variable impedance load element, a comparator, and a controller. The plurality of feeding antenna elements respectively receive a plurality of wireless signals. The demodulator demodulates the wireless signals received by the plurality of feeding antenna elements, by a MIMO method. The at least one parasitic element is provided to be electromagnetically coupled to each of the feeding antenna elements, and the at least one variable impedance load element is connected to the parasitic element. The comparator detects a received signal level of each of the wireless signals received by the feeding antenna elements and compares the received signal levels with each other, thereby detecting the minimum received signal level. The controller controls an impedance value of the variable impedance load element based on the received signal levels detected by the comparator, such that the received signal level of the wireless signal having the minimum received signal level is substantially maximized.

Thus, according to the present invention, a MIMO antenna apparatus can be provided that includes the plurality of feeding antenna elements and one or more parasitic element(s), in which the directivity thereof is controlled by changing the impedance value of the variable impedance load element connected to the parasitic element(s), such that the received signal level of the wireless signal at the feeding antenna element that receives the wireless signal with a low received signal level is substantially maximized.

According to such MIMO antenna apparatus, the control means controls the impedance value of the variable impedance load element based on respective received signal levels detected by the comparison means, such that the received signal level of the wireless signal having the minimum received signal level is substantially maximized, and thus, it is possible to provide a MIMO antenna apparatus that can perform, despite its small-sized configuration, MIMO communication with high transmission capacity and high transmission quality by maintaining good receiving conditions at the plurality of feeding antenna elements at the same time, as well as provide a mobile wireless communication apparatus provided with the MIMO antenna apparatus.

In particular, the feeding antenna element with the minimum received signal level is selected and the impedance value of the variable impedance load element is controlled such that the received signal level of the wireless signal received by the feeding antenna element is maximized. Accordingly, since unequal median values (signal level differences between feeding antenna elements) are reduced and the received signal levels are increased, an improvement in MIMO transmission characteristics can be achieved.

BRIEF DESCRIPTION OF THE DRAWINGS

Various objects, features, and advantages of the present invention will become clear from preferred embodiments which are described below with reference to the accompanying drawings.

DETAILED DESCRIPTION OF THE PREFERRED EMBODIMENTS

Figure 1:
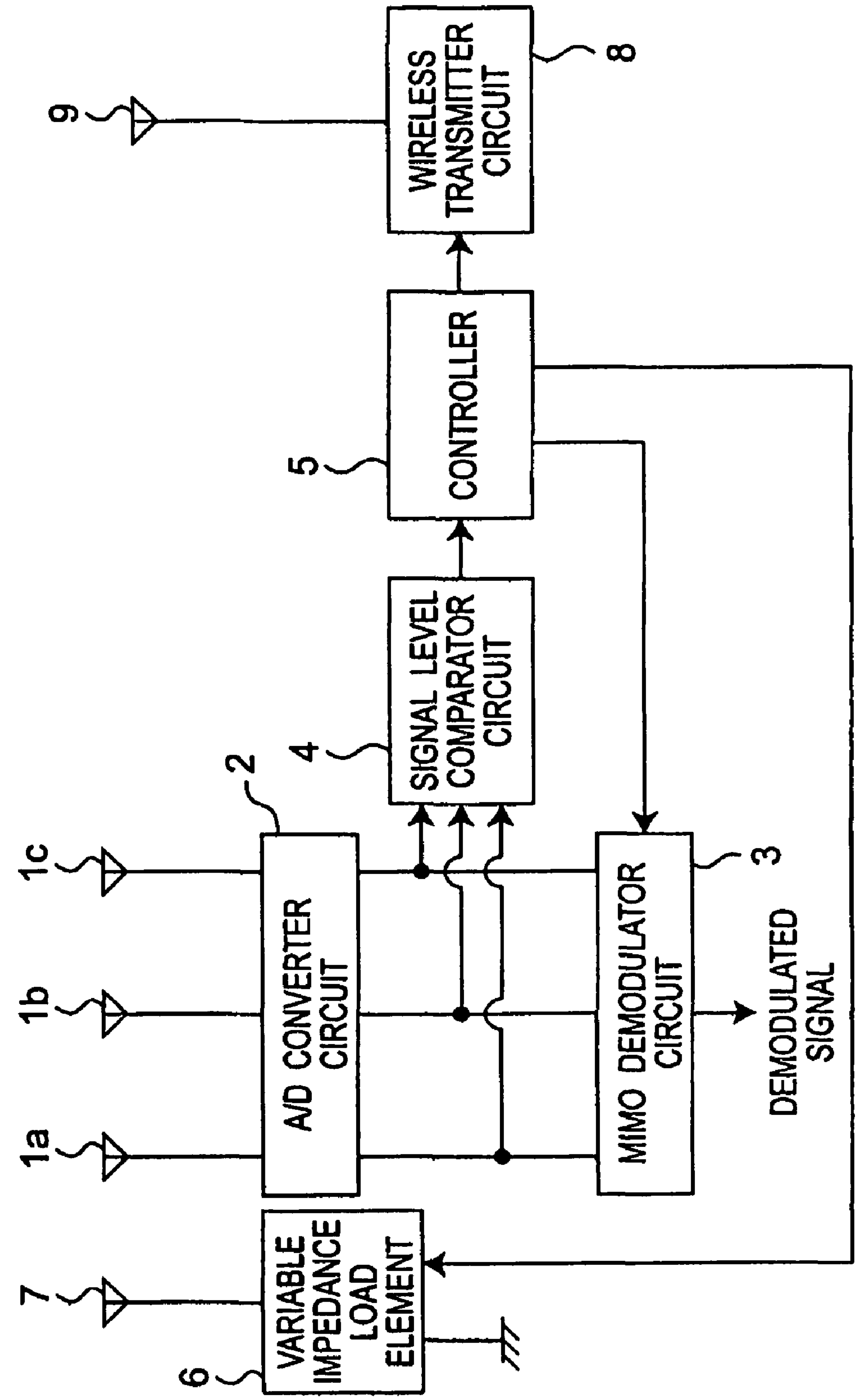
FIG. 1 is a block diagram showing a configuration of a MIMO antenna apparatus according to a first preferred embodiment of the present invention.

Preferred embodiments according to the present invention will be described below with reference to the drawings. It is noted that in the drawings, identical reference numerals denote similar components, respectively.

First Preferred Embodiment

FIG. 1 is a block diagram showing a configuration of a MIMO antenna apparatus according to a first preferred embodiment of the present invention. The MIMO antenna apparatus of the present preferred embodiment will be described below with reference to FIG. 1. Referring to FIG. 1, three feeding antenna elements 1*a*, 1*b*, and 1*c* are provided to respectively receive three different wireless signals transmitted from a MIMO sender-side base station apparatus (not shown) using a predetermined MIMO modulation method. One parasitic element 7 is provided to be in proximity to and electromagnetically coupled to the feeding antenna elements 1*a*, 1*b*, and 1*c*. To the parasitic element 7 is connected a variable impedance load element 6 having a variable impedance value. The feeding antenna elements 1*a*, 1*b*, and 1*c* input their respective received wireless signals to an analog/digital (A/D) converter circuit 2. The A/D converter circuit 2 includes three A/D converters for the respective inputted wireless signals, and each of these A/D converters individually performs an A/D conversion process on each of the wireless signals. The A/D converter circuit 2 outputs the processed signals (hereinafter, referred to as "received signals") to a MIMO demodulator circuit 3 and to a signal level comparator circuit 4. The MIMO demodulator circuit 3 performs a MIMO demodulation process on the three received signals, and outputs one demodulated signal. The signal level comparator circuit 4 compares signal levels among the three received signals, and outputs information on comparison results to a controller S. The controller 5 performs a MIMO adaptive control process based on the signal level comparison results, which will be described later with reference to FIGS. 7 to 13, thereby changing an impedance value of the variable impedance load element 6.

The controller 5 may change MIMO communication methods used by the MIMO sender-side base station apparatus and the MIMO demodulator circuit 3, depending on the result of a MIMO adaptive control process. Specifically, the controller 5 transmits, through a wireless transmitter circuit 8 and a transmitting antenna element 9 connected to the wireless transmitter circuit 8, a control signal requesting the MIMO sender-side base station apparatus to change a MIMO modulation method used by the MIMO sender-side base station apparatus, and the controller 5 also changes a MIMO demodulation method used by the MIMO demodulator circuit 3.

If necessary, it is preferable that the MIMO antenna apparatus of the present preferred embodiment is provided with, in front of the A/D converter circuit 2, a high-frequency filter for separating a certain frequency signal from each of the wireless signals received by the feeding antenna elements 1*a*, 1*b*, and 1*c*, and a high-frequency amplifier for amplifying the signals. Also, if necessary, it is preferable that the MIMO antenna apparatus of the present preferred embodiment is provided with, in front of the MIMO demodulator circuit 3, a high-frequency circuit such as a mixer, for converting a frequency of each received signal outputted from the A/D converter circuit 2, or an intermediate-frequency circuit, or a signal processing circuit, etc. For the sake of simplicity of explanation, the components listed above are omitted in this specification and the drawings.

Although an exemplary case in which there are three feeding antenna elements and one parasitic element will be described in this specification, it is also possible to adopt a configuration in which there are two or four or more feeding antenna elements or a configuration in which there are two or more parasitic elements. When a plurality of parasitic elements are provided, a plurality of variable impedance load elements, each corresponding to one of these parasitic elements, may be provided.

Figure 2:
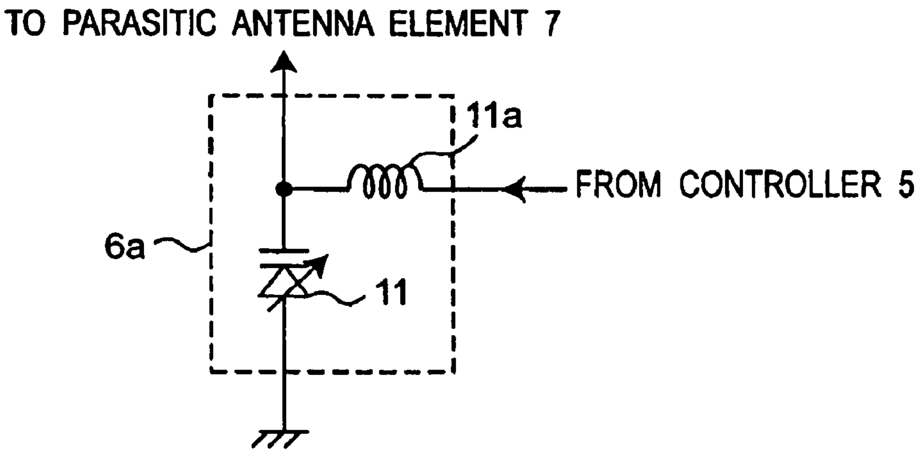
FIG. 2 is a circuit diagram showing a detailed configuration of a variable impedance load circuit 6*a* which is a first exemplary implementation of a variable impedance load element 6 of FIG. 1.

Now, exemplary implementations of the variable impedance load element 6 will be described with reference to FIGS. 2 and 3. FIG. 2 is a circuit diagram showing a detailed configuration of a variable impedance load circuit 6*a* which is a first exemplary implementation of the variable impedance load element 6. The variable impedance load circuit 6*a* features a variable capacity diode 11 for changing an impedance value. A cathode of the variable capacity diode 11 is connected to the parasitic element 7 and also connected to the controller 5 through a high-frequency blocking inductor 11*a*, and an anode of the variable capacity diode 11 is grounded. The impedance value of the variable capacity diode 11 varies according to a control voltage to be applied by the controller 5. Furthermore, in order to obtain a desired impedance load value, it is also possible to use a circuit configuration additionally including other fixed elements (capacitor(s) and inductor(s)) or a circuit configuration using a plurality of variable capacity diodes.

Figure 3:
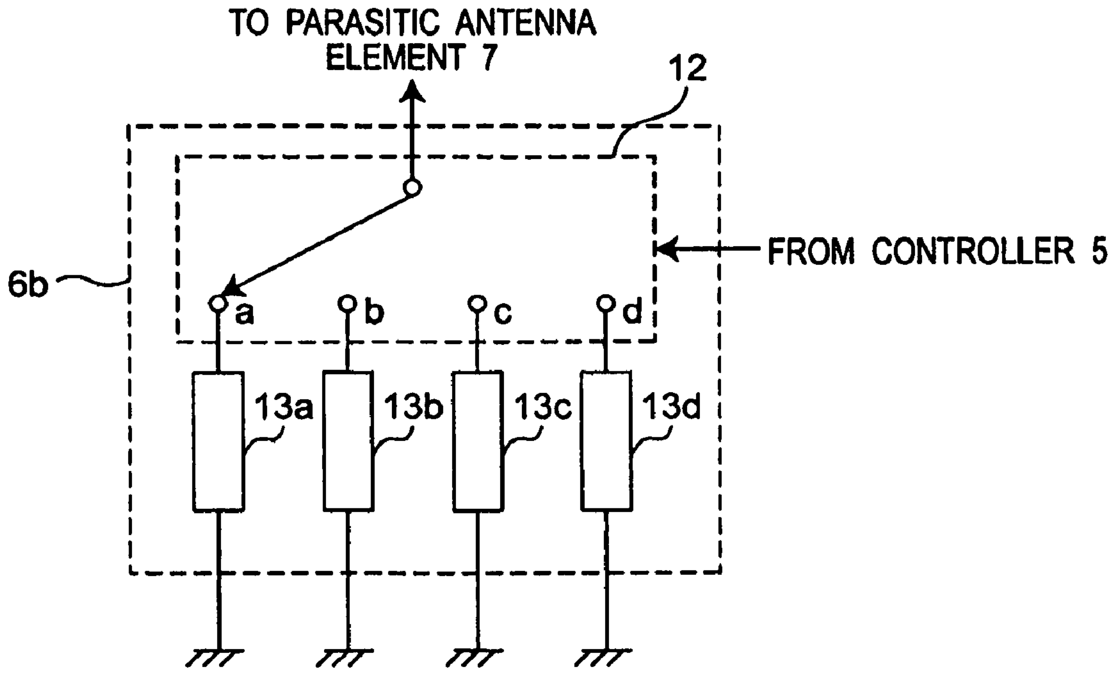
FIG. 3 is a circuit diagram showing a detailed configuration of a variable impedance load circuit 6*b* which is a second exemplary implementation of the variable impedance load element 6 of FIG. 1.

FIG. 3 is a circuit diagram showing a detailed configuration of a variable impedance load circuit 6*b* which is a second exemplary implementation of the variable impedance load element 6. The variable impedance load circuit 6*b* features impedance load elements 13*a*, 13*b*, 13*c*, and 13*d*, having different impedance values, respectively. One electrode of each of the impedance load elements 13*a*, 13*b*, 13*c*, and 13*d* is connected to a switch 12, and the respective other electrodes are grounded. The switch 12 connects either one of the impedance load elements 13*a*, 13*b*, 13*c*, and 13*d* to the parasitic element 7, according to control of the controller 5. Although FIG. 3 shows, as an example, a configuration using four impedance load elements 13*a*, 13*b*, 13*c*, and 13*d*, the configuration is not limited thereto and a configuration using an arbitrary number of two or more impedance load elements can be used. Alternatively, for an impedance load element of a modified preferred embodiment, it is also possible to use a configuration additionally including other fixed elements or variable capacity diodes, or a configuration using a circuit including a combination thereof, in order to obtain a desired impedance load value. By means of such a configuration of the modified preferred embodiment, it is possible to change an impedance load value in a stepwise manner and continuously change the impedance load value over a wide range.

According to the above-described MIMO antenna apparatus of the present preferred embodiment, the controller 5 controls the impedance value of the variable impedance load element 6 based on respective received signal levels detected by the signal level comparator circuit 4, such that the received signal level of the wireless signal having the minimum received signal level is substantially maximized, and thus, it is possible to provide a MIMO antenna apparatus that can perform, despite its small-sized configuration, MIMO communication with high transmission capacity and high transmission quality by maintaining good receiving conditions at the plurality of feeding antenna elements at the same time.

Figure 4:
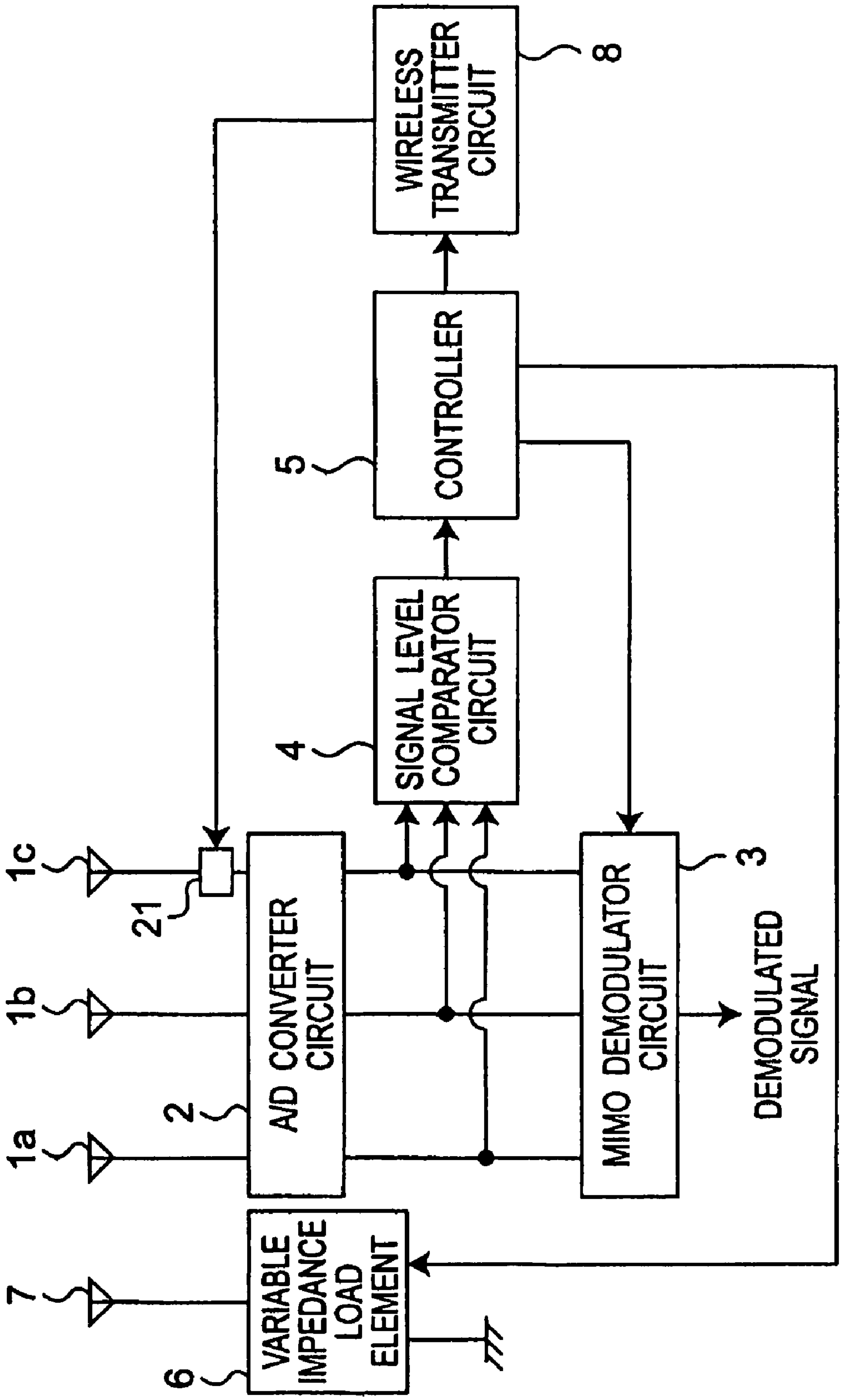
FIG. 4 is a block diagram showing a configuration of a MIMO antenna apparatus according to a modified preferred embodiment of the first preferred embodiment of the present invention.

FIG. 4 is a block diagram showing a configuration of a MIMO antenna apparatus according to a modified preferred embodiment of the first preferred embodiment of the present invention. The MIMO antenna apparatus of the modified preferred embodiment is characterized by a configuration in which the transmitting antenna element 9 of FIG. 1 is integrated into one of the feeding antenna elements 1*a*, 1*b*, and 1*c*. Referring to FIG. 4, the feeding antenna element 1*c* is provided with an antenna duplexer 21 at its lower end. A wireless signal received by the feeding antenna element 1*c* is inputted to the A/D converter circuit 2 through the antenna duplexer 21, and on the other hand, the wireless signal outputted from the wireless transmitter circuit 8 excites the feeding antenna element 1*c* through the antenna duplexer 21. A feeding antenna element into which the transmitting antenna element 9 is integrated may be either of feeding antenna elements 1*a* and 1*b* as well. With the above configuration, the MIMO antenna apparatus of the modified preferred embodiment of FIG. 4 can reduce the number of antenna elements in the apparatus.

Figure 5:
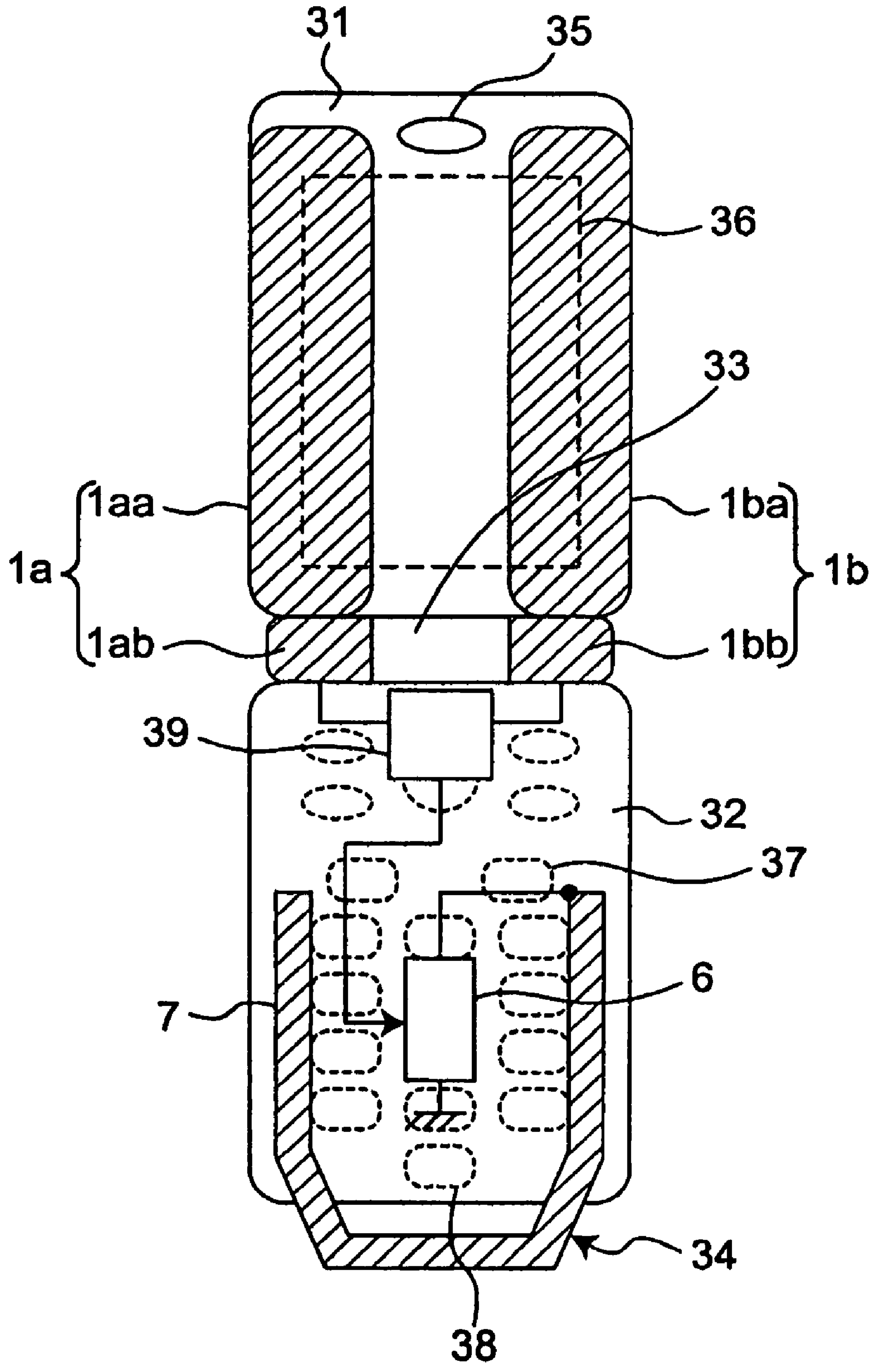
FIG. 5 is a perspective view showing a configuration of a portable wireless communication apparatus including a MIMO antenna apparatus, according to a first practical example of the first preferred embodiment of the present invention.

Next, examples in which the MIMO antenna apparatus of the present preferred embodiment is implemented on a portable wireless communication apparatus will be described with reference to FIGS. 5 and 6. FIG. 5 is a perspective view showing a configuration of a portable wireless communication apparatus including a MIMO antenna apparatus, according to a first practical example of the present preferred embodiment. In this practical example, the case will be described in which the portable wireless communication apparatus is provided with two feeding antenna elements 1*a* and 1*b*, and one of the feeding antenna elements 1*a* and 1*b* (e.g., the feeding antenna element 1*b*) is also utilized as the transmitting antenna element.

The portable wireless communication apparatus of FIG. 5 is configured as a folding mobile phone which includes an upper housing 31 and a lower housing 32 each substantially shaped in a rectangular parallelepiped, and in which the upper housing 31 and the lower housing 32 are connected to each other by a hinge unit 33. The upper housing 31 is configured to include a speaker 35 and a display 36, and the lower housing 32 is configured to include a keyboard 37 and a microphone 38. In the upper housing 31, a strip-shaped conductor 1*aa* is provided so as to be proximate to a left side of the upper housing 31 and to be in parallel to a longitudinal direction of the portable wireless communication apparatus. The strip-shaped conductor 1*aa* is electrically connected to a hinge conductor 1*ab* that constitutes a part of the hinge unit 33. The strip-shaped conductor 1*aa* and the hinge conductor 1*ab* act as the feeding antenna element 1*a* as a whole. Similarly, in the upper housing 31, a strip-shaped conductor 1*ba* is provided so as to be proximate to a right side of the upper housing 31 and to be in parallel to the longitudinal direction of the portable wireless communication apparatus. The strip-shaped conductor 1*ba* is electrically connected to a hinge conductor 1*bb* that constitutes a part of the hinge unit 33. The strip-shaped conductor 1*ba* and the hinge conductor 1*bb* act as the feeding antenna element 1*b* as a whole. The parasitic element 7, which is made of a strip-shaped conductor and folded into a U-shape, is provided in the lower housing 32. To one end of the parasitic element 7 is connected the variable impedance load element 6. In the practical example shown in FIG. 5, a part of the parasitic element 7 is provided so as to penetrate into a boom unit 34 that protrudes from a lower end of the lower housing 32. Alternatively, the entire parasitic element 7 may be provided in the lower housing 32. The portable wireless communication apparatus has a wireless communication circuit 39 including an A/D converter circuit 2, a MIMO demodulator circuit 3, a signal level comparator circuit 4, a controller 5, a wireless transmitter circuit 8, an antenna duplexer 21 and the like shown in FIG. 4. The A/D converter circuit 2 in the wireless communication circuit 39 is connected to the feeding antenna element 1*a* and also connected to the feeding antenna element 1*b* through the antenna duplexer 21. The wireless transmitter circuit 8 in the wireless communication circuit 39 is connected to the feeding antenna element 1*b* through the antenna duplexer 21. The controller 5 in the wireless communication circuit 39 is connected to the variable impedance load element 6, and changes an impedance value of the variable impedance load element 6.

Figure 6:
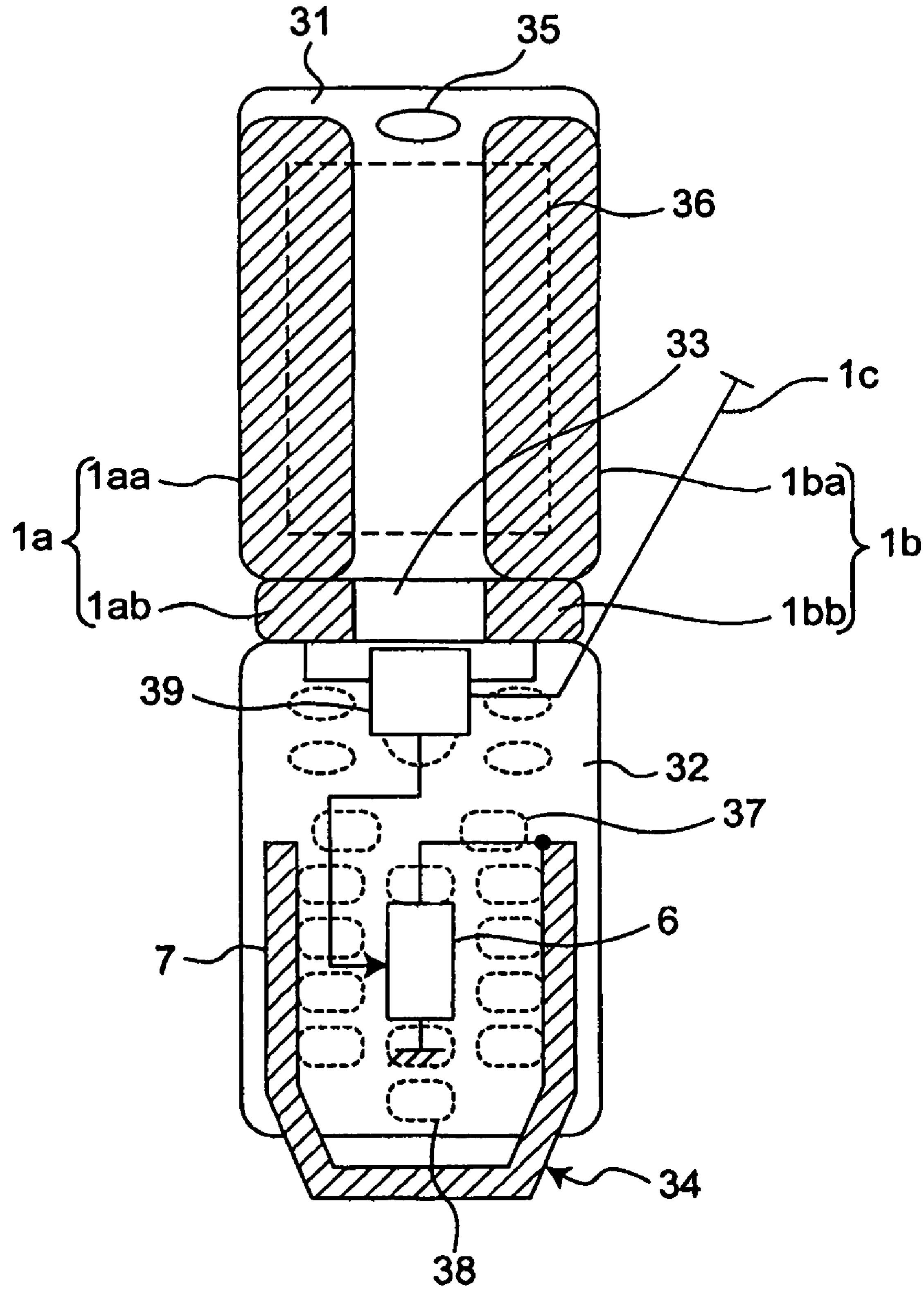
FIG. 6 is a perspective view showing a configuration of a portable wireless communication apparatus including a MIMO antenna apparatus, according to a second practical example of the first preferred embodiment of the present invention.

FIG. 6 is a perspective view showing a configuration of a portable wireless communication apparatus including a MIMO antenna apparatus, according to a second practical example of the present preferred embodiment. In the practical example of FIG. 6, the portable wireless communication apparatus is provided with a feeding antenna element 1*c* made of a rod-shaped conductor and protruding from the lower housing 34, in addition to the components in the practical example of FIG. 5, and performs communication using three feeding antenna elements 1*a*, 1*b*, and 1*c*. In this example, one of the feeding antenna elements 1*a*, 1*b*, and 1*c* (e.g., the feeding antenna element 1*c*) is also utilized as a transmitting antenna element. The portable wireless communication apparatus of the practical example of FIG. 6 can achieve MIMO communication with higher transmission capacity and higher transmission quality, by using a larger number of feeding antenna elements 1*a*, 1*b*, and 1*c* than that of the practical example of FIG. 5.

The MIMO communication system falls under a technique for increasing a transmission capacity and for increasing a total transmission rate in relation to a plurality of signal sequences after MIMO demodulation, by employing a plurality of antenna elements in each of a transmitter and a receiver and spatially multiplexing the plurality of signal sequences simultaneously transmitted in the same frequency band. In the present specification, the MIMO communication system is described based on an eigenmode transmission scheme by way of example. It is supposed that the number of antenna elements in each of the transmitter and the receiver is n, then the received signal y is expressed by the following equation:

$$y=Hx+w \tag{1},$$

where symbol y denotes a received signal and is of a vector with a size of n, and each element of the vector denotes a signal received through each one of the antenna elements of the receiver. Symbol H denotes a matrix with a size of n×n, the matrix is called "channel matrix", and each element $H_{ij}$ of the matrix denotes a propagation coefficient between a j-th antenna element of the transmitter and an i-th antenna element of the receiver, i.e., amounts of phase rotation and amplitude attenuation for the signal transmitted between these antenna elements. Furthermore, symbol x denotes a transmitted signal and is of a vector with a size of n, and each element $x_i$ of the vector is a signal transmitted from each one of the antenna elements of the transmitter and orthogonal to the other signals. Symbol w is of a vector with a size of n, and each element of the vector denotes a thermal noise received through each one of the antenna elements of the receiver.

For obtaining the channel matrix H at the receiver, the receiver stores therein a predetermined pilot signal x in advance, the transmitter transmits this known pilot signal x to the receiver, and the receiver calculates the channel matrix H by using the equation (1) based on the pilot signal x previously stored in the receiver and the received signal y (i.e., the transmitted pilot signal x).

Then, by carrying out a singular value decomposition (SVD) on the channel matrix H, the following equation is obtained:

$$H = U\sum V^H = \sum_{i=1}^{q} \sigma_i u_i v_i^H \tag{2}$$

where symbols U, Σ and V denote matrixes each with a size of n×n, and the matrix Σ consists of $\sigma_i$ ($0 \leqq i \leqq q$) at i-th row and an i-th column elements and 0 at the other elements. Further, symbol $u_i$ denotes i-th column vector of the matrix U, and is orthogonal to the other column vectors, and similarly, symbol $v_i$ denotes i-th column vector of the matrix V, and is orthogonal to the other vectors. Symbol q denotes a rank of the channel matrix H, and let q=n in the following description. A superscript H denotes a complex conjugate transposition. Further, the matrixes U and V satisfy the following equation:

$$U^H U = I_n \tag{3}, \text{ and}$$

$$V^H V = I_n \tag{4},$$

where the symbol $I_n$ is a identity matrix with a size of n×n.

Moreover, by carrying out eigenvalue decomposition (EVD), the following equation (5) is obtained:

$$\begin{aligned} HH^H &= U\sum V^H \left(U\sum V^H\right)^H \\ &= U\sum \sum^H U^H \\ &= \sum_{i=1}^{q} \lambda_i u_i u_i^H, \end{aligned} \tag{5}$$

-continued where symbol $\lambda_i$ denote eigenvalues of a channel matrix product $HH^H$ and satisfies $\lambda_i=\sigma_i^2$.

A vector $u_i^H$ is orthogonal to the other row vectors of the matrix $U^H$, and used as weight coefficients (amplitudes and phases) for the signals transmitted from the respective antenna elements of the transmitter. The vector $u_i$ is orthogonal to the other column vectors of the matrix U, and used as weight coefficients (amplitudes and phases) for the signals received at the respective antenna elements of the receiver. By using the weight coefficients in such manner, orthogonal directivities can be obtained.

Now, according to the equation (1), respective powers of the received signals are represented as: $Hx(Hx)^H=HH^H xx^H$. The matrix $xx^H$ represents respective powers of the transmitted signals. It is to be noted that since the respective elements of the vector x are the signals orthogonal to one another, the matrix $xx^H$ is a diagonal matrix diag $[x_i x_1^*, x_2 x_2^*, \ldots, x_n x_n^*]$, and the matrix $HH^H$ is a diagonal matrix diag $[\lambda_1, \lambda_2, \ldots, \lambda_q]$. Namely, by employing the orthogonal weight coefficients for the respective antenna elements in each of the transmitter and the receiver, a plurality of propagation channels can be separated, and in this case, the respective powers of the received signals are $\lambda_i x_i x_i^*$. If all the signals $x_i$ are equal to each other, the powers of the received signals in the respective propagation channel are proportional to the eigenvalues $\lambda_i$.

Here, it is specifically described how to derive the powers of received signals, by taking a MIMO communication system as an example in which a transmitter has two antenna elements and a receiver has two antenna elements. In this case, the channel matrix H, and the transmitted signal vector x including the signals transmitted from the antenna elements of the transmitter are expressed by the following equations, respectively:

$$H = \begin{bmatrix} H_{11} & H_{12} \\ H_{21} & H_{22} \end{bmatrix}, \text{ and} \tag{6}$$

$$x = \begin{bmatrix} x_1 \\ x_2 \end{bmatrix}. \tag{7}$$

Now, suppose that the symbol w denotes a noise vector (ratio in amplitude with respect to the transmitted signal vector x) including the noises received through the antenna elements of the receiver, then a received signal vector y is expressed by the following equation:

$$\begin{aligned} y &= H \cdot x + w \\ &= \begin{bmatrix} H_{11} & H_{12} \\ H_{21} & H_{22} \end{bmatrix} \begin{bmatrix} x_1 \\ x_2 \end{bmatrix} + \begin{bmatrix} w_1 \\ w_2 \end{bmatrix} \\ &= \begin{bmatrix} y_1 \\ y_2 \end{bmatrix}. \end{aligned} \tag{8}$$

Next, a covariance matrix $R_{yy}$ of the received signal vector is calculated from the following equation:

$$R_{yy} = y \cdot y^H = \begin{bmatrix} y_1 \\ y_2 \end{bmatrix} \cdot [y_1^* \; y_2^*]. \tag{9}$$

The vector $y^H$ in the above equation is expressed by the following equation:

$$y^H = [y_1^* \; y_2^*] = [x_1^* \; x_2^*]\begin{bmatrix} H_{11}^* & H_{21}^* \\ H_{12}^* & H_{22}^* \end{bmatrix} + [w_1^* \; w_2^*]. \tag{10}$$

Generally speaking, in the MIMO communication system, different signals transmitted from the different antenna elements of the transmitter are uncorrelated to one another. Now, the meaning of the statement that the transmitted signals are uncorrelated is described below. It is supposed that a transmitted signal sequence is a one-dimensional signal sequence consisting of elements "−1" and "1". For example, consider a case that each of the transmitted signal vectors $x_1$ and $x_2$ includes the following four elements:

$$x_1=(1, -1, 1, 1) \tag{11}$$, and $$x_2=(1, 1, -1, 1) \tag{12}.$$

Under a definition of "correlation", i.e., a sum of products of the corresponding elements in the respective signal sequences divided by the length of the signal sequences, a correlation value $R_{12}$ between the transmitted signal vectors $x_1$ and $x_2$ is expressed by the following equation:

$$R_{12}=(1\times1+(-1)\times1+1\times(-1)+1\times1)/4=0 \tag{13}.$$

Namely, if the correlation value $R_{12}$ is 0, the transmitted signal vectors $x_i$ and $x_2$ are uncorrelated to each other. Conversely, the correlation value $R_{12}$ is 1 in the case that the transmitted signal vectors $x_1$ and $x_2$ are equal, i.e., $x_1=x_2$. Furthermore, the noise vector is uncorrelated to the transmitted signal vectors, and the noise vectors received through different antenna elements are uncorrelated to one another.

Accordingly, as the powers of the received signals, an expectation of the covariance matrix $R_{yy}$ of the equation (9) can be calculated by the following equation:

$$\begin{aligned} R_{yy} &= \begin{bmatrix} y_1 \\ y_2 \end{bmatrix}[y_1^* \; y_2^*] \\ &= \begin{bmatrix} H_{11} & H_{12} \\ H_{21} & H_{22} \end{bmatrix}\begin{bmatrix} x_1 \\ x_2 \end{bmatrix}[x_1^* \; x_2^*]\begin{bmatrix} H_{11}^* & H_{21}^* \\ H_{12}^* & H_{22}^* \end{bmatrix} + \begin{bmatrix} w_1 \\ w_2 \end{bmatrix}[w_1^* \; w_2^*] \\ &= \begin{bmatrix} H_{11} & H_{12} \\ H_{21} & H_{22} \end{bmatrix}\begin{bmatrix} H_{11}^* & H_{21}^* \\ H_{12}^* & H_{22}^* \end{bmatrix} + \begin{bmatrix} |w_1|^2 & w_1 w_2^* \\ w_2 w_1^* & |w_2|^2 \end{bmatrix} \\ &= H \cdot H^H + \begin{bmatrix} |w_1|^2 & 0 \\ 0 & |w_2|^2 \end{bmatrix} \\ &= H \cdot H^H + |w|^2\begin{bmatrix} 1 & 0 \\ 0 & 1 \end{bmatrix}, \end{aligned} \tag{14}$$

where the following equation is employed from the assumption on the transmitted signal vectors:

$$\begin{aligned} R_{xx} &= \begin{bmatrix} x_1 \\ x_2 \end{bmatrix}[x_1^* \; x_2^*] \\ &= \begin{bmatrix} |x_1|^2 & x_1 x_2^* \\ x_2 x_1^* & |x_2|^2 \end{bmatrix} \\ &= \begin{bmatrix} 1 & 0 \\ 0 & 1 \end{bmatrix}. \end{aligned} \tag{15}$$

According to the operation principle of the MIMO antenna apparatus described above, a transmission capacity of the MIMO communication system is obtained by the following equation:

$$C_{MIMO} = \log_2\left|I_n + \frac{SNR}{n}HH^H\right| = \sum_{i=1}^{q}\log_2\left(1 + \frac{SNR}{n}\lambda_i\right), \tag{16}$$

where symbol SNR denotes a total transmitted signal power-to-noise ratio, i.e., satisfies $SNR/n=x_1 \, x_i^*$. The unit of $C_{MIMO}$ is [bit/sec/Hz]. On the other hand, in case of normal one-to-one communication (Single-Input Single-Output: SISO) in which the transmitter employs one antenna element and the receiver employs one antenna element, a transmission capacity is obtained by the following equation:

$$C_{SISO}=\log_2(1+SNR\cdot hh^*) \tag{17}$$

where symbol h denotes a propagation coefficient, and the unit of $C_{SISO}$ is [bit/sec/Hz].

It is supposed that for example, $hh^*=\lambda_i=\lambda$ and $SNR\cdot\lambda/n>>1$ for simplification of comparison between the equations (16) and (17). In this case, the transmission capacity expressed by the equation (16) is calculated as shown 15 in the following equation:

$$C_{MIMO}=n\cdot(\log_2(SNR\cdot\lambda)-\log_2(n)) \tag{18}$$

On the other hand, the transmission capacity expressed by the equation (17) is calculated as shown in the following equation:

$$C_{SISO}=\log_2(SNR\cdot\lambda) \tag{19}$$

In a case of n=4 and $SNR\times\lambda=1024$, for example, the MIMO transmission capacity $C_{MIMO}=4\times(10-2)=32$ [bit/sec/Hz] and a SISO transmission capacity $C_{SISO}=10$ [bit/sec/Hz]. Therefore, it is understood that the MIMO transmission capacity increases more than the SISO transmission capacity.

In such manner, the MIMO antenna apparatus spatially multiplexes signals and increases the transmission capacity by allocating to each of the signal sequences the directivity that signals are orthogonal to one another, and accordingly, the total transmission rate of the MIMO-demodulated signal sequences can be improved.

According to the equation (16), it can be seen that the greater the eigenvalues $\lambda_i$ calculated from the channel matrix H become, the more the MIMO transmission capacity increases. This means that higher-rate transmission can be achieved as the respective elements of the channel matrix H increase, since the eigenvalues $\lambda_i$ are obtained by the respective elements of the channel matrix H. Moreover, as expressed in the equation (1), the received signal vector includes the thermal noise vector w. Because thermal noise components can not be eliminated in the actual receiver, it causes errors when calculating the eigenvalues $\lambda_i$ from the channel matrix H. Accordingly, in order to improve the transmission rate of the MIMO antenna apparatus, the powers of the received signals are to be made as large as possible. Further, the channel matrix H includes the gains of the antenna elements of the transmitter and the receiver, in addition to propagation loss. Accordingly, it can be seen that under the same propagation environment, the antenna elements with high gains are preferred.

Thus, in a MIMO antenna apparatus, the respective received signals received by a plurality of feeding antenna elements should be in good receiving conditions at the same time. However, in a wireless communication apparatus that is used particularly in proximity to the human body, such as a mobile phone, the directivities of some of antenna elements may degrade due to the influence of the human body or the like. Because of this degradation, the high-speed wireless communication capability inherent to a MIMO antenna apparatus may be lost.

Accordingly, as shown in FIG. 1, the variable impedance load element 6 is connected to the parasitic element 7 electromagnetically coupled to the feeding antenna elements 1*a*, 1*b*, and 1*c*, the A/D converter circuit 2 converts the received signals into the digital signals, and thereafter, the signal level comparator circuit 4 compares the signal levels among the received signals each received by the feeding antenna elements 1*a*, 1*b*, and 1*c*, and the impedance value of the variable impedance load element 6 connected to the parasitic element 7 is changed such that the signal level at one feeding antenna element having the minimum signal level is substantially maximized. Namely, the directivity of the feeding antenna elements 1*a*, 1*b*, and 1*c* can be indirectly controlled, by changing a current flowing through the parasitic element 7 electromagnetically coupled to the feeding antenna elements 1*a*, 1*b*, and 1*c* by means of the variable impedance load element 6. Thus, by reducing signal level differences between the received signals at the respective antenna elements to be inputted into the MIMO demodulator circuit 3 and increasing the sensitivity of each antenna element, an improvement in MIMO transmission characteristics is achieved.

Now, a MIMO adaptive control process performed by the controller 5 to implement control such as that described above will be described below with reference to FIGS. 7 to 13.

Figure 7:
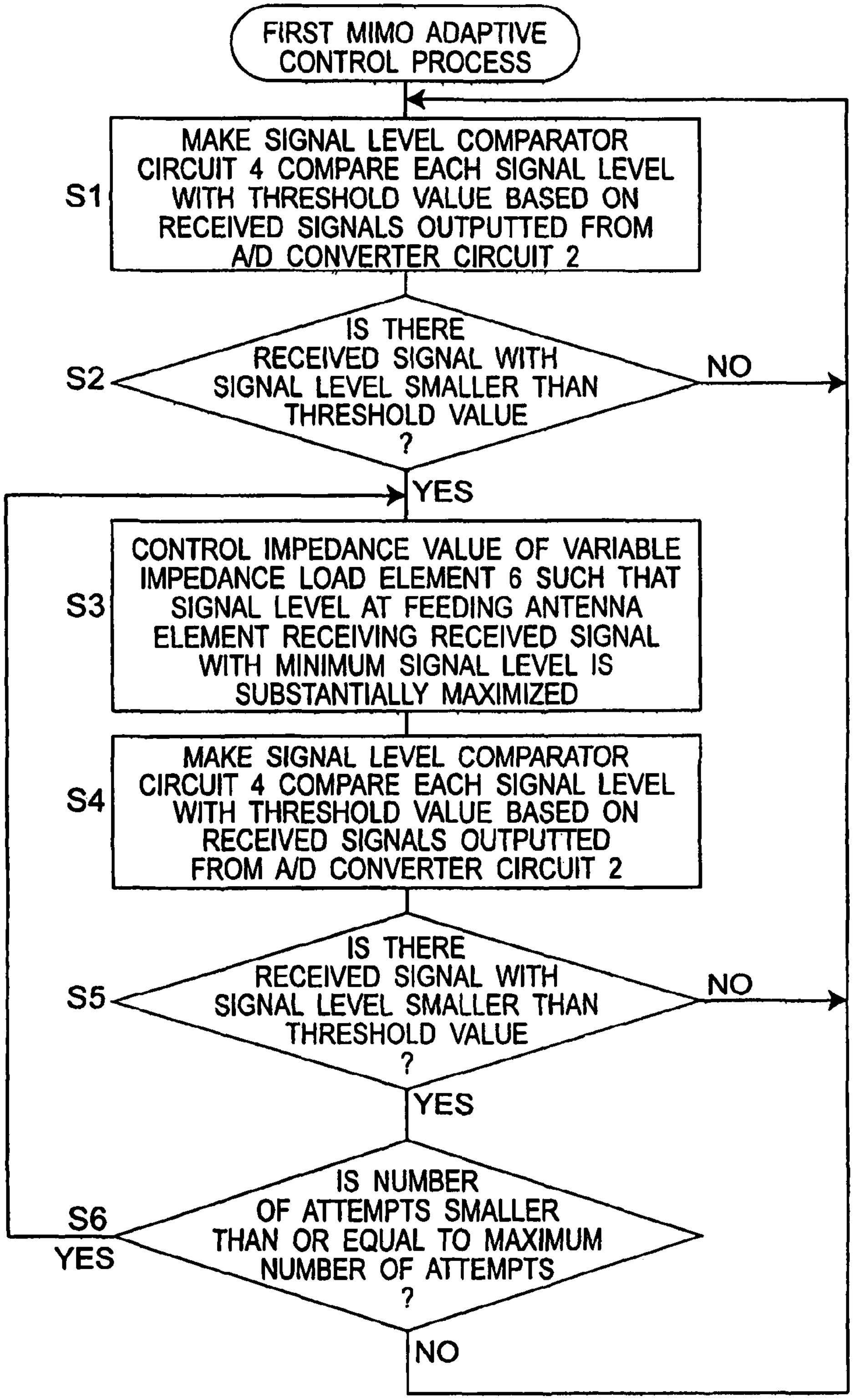
FIG. 7 is a flowchart showing a first MIMO adaptive control process which is performed by a controller 5 of FIG. 1.

FIG. 7 is a flowchart showing a first MIMO adaptive control process which is performed by the controller 5 of FIG. 1. The controller 5 can control the impedance value of the variable impedance load element 6 so as to improve the signal level of the received signal received by any one of the feeding antenna elements 1*a*, 1*b*, and 1*c*. However, the most desirable control method is that the impedance value of the variable impedance load element 6 is changed by the controller 5 such that signal levels of received signals at all of the feeding antenna elements 1*a*, 1*b*, and 1*c* are larger than or equal to a threshold value. Referring to FIG. 7, such MIMO adaptive control process will be described. Note that although a demodulation process by the MIMO demodulator circuit 3 is not described in FIG. 7, the MIMO demodulator circuit 3 continuously performs a demodulation operation based on data in received signals obtained by the A/D converter circuit 2, in parallel with the MIMO adaptive control process by the controller 5.

In step S1 of FIG. 7, the controller 5 makes the signal level comparator circuit 4 compare the signal level of each received signal with a threshold value, based on the received signals outputted from the A/D converter circuit 2, and obtains information on comparison results from the signal level comparator circuit 4. For example, the threshold value of the signal level is set to a low level corresponding to a lower limit at which the received signal can be detected, or alternatively, the threshold value may be set to other levels such as the signal level corresponding to an error-free threshold value which is dependent on the MIMO communication method. In the first MIMO adaptive control process, the signal level comparator circuit 4 detects received signal levels smaller than the threshold value. In step S2, if there is a received signal having a signal level smaller than the threshold value, the controller 5 proceeds to step S3; otherwise, the controller 5 returns to step S1 and makes the MIMO demodulator circuit 3 continue the normal demodulation process. In step S3, the controller 5 controls the impedance value of the variable impedance load element 6 such that the signal level of the received signal at the feeding antenna element receiving the received signal having the minimum signal level among signal levels smaller than the threshold value is substantially maximized. A control method will be described in detail later. After controlling the impedance value of the variable impedance load element 6, in step S4, as with the processing in step S1, the controller 5 makes the signal level comparator circuit 4 compare again the signal level of each received signal with the threshold value used in step S1 based on the received signals outputted from the A/D converter circuit 2, and obtains information on comparison results from the signal level comparator circuit 4. In step 5, if there is a received signal having a signal level smaller than the threshold value, the controller 5 proceeds to step S6; otherwise, the controller 5 returns to step S1 and makes the MIMO demodulator circuit 3 continue the normal demodulation process. In step S6, the controller 5 determines whether the number of attempts to control the impedance value (i.e., the number of times that step S3 is performed) is smaller than or equal to the maximum number of attempts. For example, the maximum number of attempts is set to three times, or alternatively, different numbers may be set, depending on the throughput of the controller 5 or the like. If a result in step S6 is "YES", then the controller 5 returns to step S3; if "NO", then the controller 5 determines that the performed MIMO adaptive control process was not effective, and accordingly, returns to step S1 and makes the MIMO demodulator circuit 3 continue the normal demodulation process.

Now, an example of a method for controlling the impedance value of the variable impedance load element 6 in step S3 is shown below. Let Pr(t0) be the signal level of the received signal at the feeding antenna element in question at time t0. Then, it is supposed that the impedance value of the variable impedance load element 6 is Z(t0)=j×X, where j is an imaginary unit. That is, the impedance value Z0 is of a reactance. This is because if the variable impedance load element 6 is a resistor, the signal level of a received signal decreases due to heat loss of the resistor.

Let Δt be the minimum time step size for changing the impedance value, and let ΔX be the minimum step size of the impedance value to be changed. It is supposed that if the variable impedance load value is changed to Z(t0+Δt)=j×(X+ΔX) at time t0+Δt, the signal level changes to Pr(t0+Δt). Let a natural number n being the number of attempts to change the impedance value. In general, a signal level difference ΔPr(t0+n×Δt) between adjacent times t0+(n−1)×Δt and t0+n×Δt is defined by the following equation:

$$\Delta Pr(t0+n\times\Delta t)=\Delta Pr(t0+n\times\Delta t)-\Delta Pr(t0+(n-1)\times\Delta t) \quad (20).$$

When the signal level difference at time t0+Δt is ΔPr(t0+Δt)≧0, the impedance value is changed such that $$Z(t0+2\times\Delta t)=j\times(X+\Delta X+\Delta X)=j\times(X+2\times\Delta X) \quad (21),$$

and when the signal level difference $\Delta Pr(t0+\Delta t)<0$, the impedance value is changed such that $$Z(t0+2\times\Delta t)=j\times(X-\Delta X) \quad (22).$$

Next, a sign of the signal level difference $\Delta Pr(t0+2\times\Delta t)$ at time $t0+2\times\Delta t$ is determined. When the signal level difference $\Delta Pr(t0+2\times\Delta t)\geqq 0$, the impedance value is changed by a step size $\Delta X$ and with the same sign as that for the change in impedance value at time $t0+2\times\Delta t$. For example, when the impedance value at time $t0+2\times\Delta t$ is $Z(t0+2\times\Delta t)=j\times(X+2\times\Delta X)$, the impedance value is changed such that $$Z(t0+3\times\Delta t)=j\times(X+3\times\Delta X) \quad (23),$$

and when the impedance value at time $t0+2\times\Delta t$ is $Z(t0+2\times\Delta t)=j\times(X-\Delta X)$, the impedance value is changed such that $$Z(t0+3\times\Delta t)=j\times(X-2\times\Delta X) \quad (24).$$

On the other hand, when the signal level difference $\Delta Pr(t0+2\times\Delta t)<0$, the impedance value is changed by a step size $k\times\Delta X$ and with the opposite sign to that for the change in impedance value at time $t0+2\times\Delta t$. It is supposed that the parameter k satisfies $0<k<1$. Specifically, when the impedance value at time $t0+2\times\Delta t$ is $Z(t0+2\times\Delta t)=j\times(X+2\times\Delta X)$, the impedance value is changed such that $$Z(t0+3\times\Delta t)=j\times(X+2\times\Delta X-k\times\Delta X)=j\times(X+(2-k)\times\Delta X) \quad (25),$$

and when the impedance value at time $t0+2\times\Delta t$ is $Z(t0+2\times\Delta t)=j\times(X-\Delta X)$, the impedance value is changed such that $$Z(t0+3\times\Delta t)=j\times(X-\Delta X+k\times\Delta X)=j\times(X-(1-k)\times\Delta X) \quad (26).$$

Namely, the amount of change in impedance value is determined based on the sign of the determined signal level difference $\Delta Pr(t0+2\times\Delta t)$. When the signal level difference $\Delta Pr\geqq 0$, the impedance value is changed by an amount of change $j\times k\times\Delta X$ and with the same sign as that for the impedance value $Z(t0+2\times\Delta t)$ at time $t0+2\times\Delta t$. In this case, the parameter k is 1, and the parameter k remains 1 as long as the signal level difference continues to satisfy $\Delta Pr\geqq 0$. On the other hand, when the signal level difference $\Delta Pr<0$, the impedance value is changed by an amount of change $j\times k\times\Delta X$ and with the opposite sign to that for the impedance value $Z(t0+2\times\Delta t)$ at time $t0+2\times\Delta t$. In this case, the parameter k is changed to a positive real constant that satisfies $0<k<1$. Once the signal level difference has become $\Delta Pr<0$, and in subsequent attempts, as long as the signal level difference satisfies $\Delta Pr<0$, the amount of each subsequent change in impedance value is $j\times k(i+1)\times\Delta X$. The parameter i denotes the number of attempts, which starts from an initial state (i.e., i=1) every time the signal level difference satisfies $\Delta Pr<0$. Also in this case, during the number of attempts, when the signal level difference $\Delta Pr\geqq 0$, the impedance value is changed with the same sign as that for a previous change in impedance value, and when the signal level difference $\Delta Pr<0$, the impedance value is changed with the opposite sign to that for a previous change in impedance value. Note that the reason that the parameter k is conditioned to be a positive real constant satisfying $0<k<1$ is to achieve the convergence of solution while preventing that the solution diverges or oscillates.

In step S3, by repeating the above-described attempt a predetermined number of times, the signal level of the received signal at the feeding antenna element that provides the received signal having the minimum signal level can be substantially maximized. Furthermore, it is possible to set a preferable threshold value of the signal level. In this case, by stopping the attempt at the point when the signal level exceeds the threshold value, it is possible to omit unnecessary controls and to lower the amount of power consumption.

Figure 14:
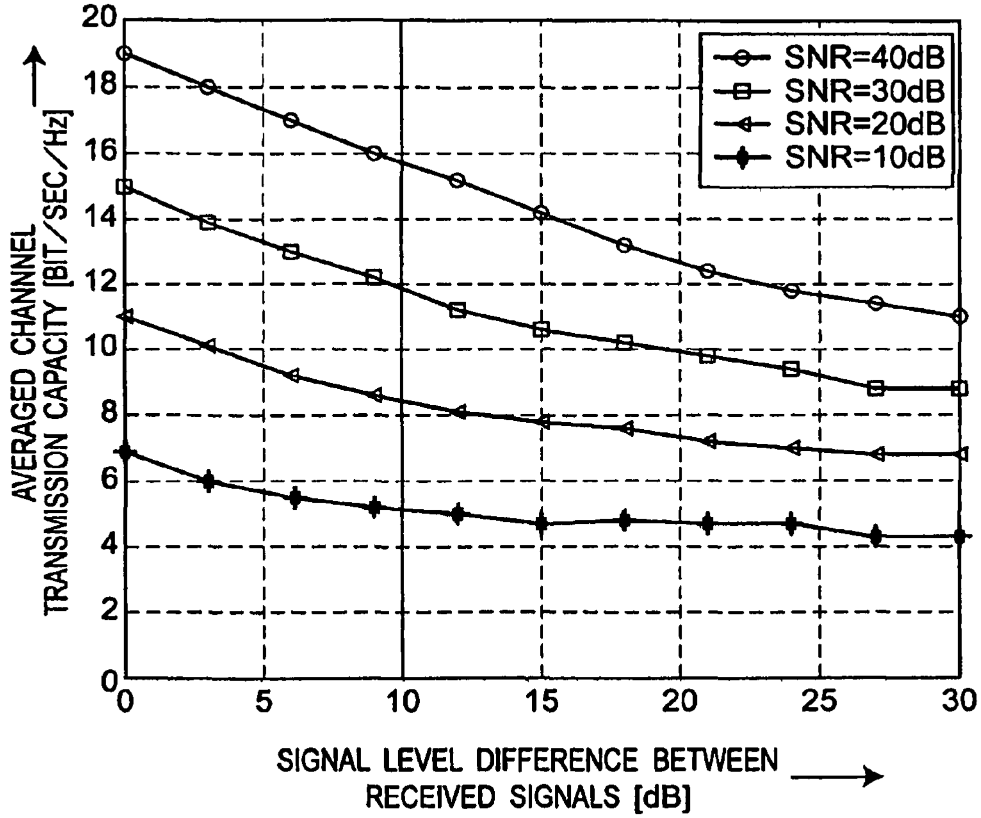
FIG. 14 is a graph showing a decrease in averaged channel transmission capacity when there is a signal level difference between received signals which are received by a plurality of antenna elements in the MIMO antenna apparatus according to the first preferred embodiment of the present invention.

In the MIMO adaptive control process of the present preferred embodiment, instead of focusing only on the received signal having the minimum signal level, the impedance value of the variable impedance load element 6 may be controlled so as to reduce the signal level difference between the received signals. FIG. 14 is a graph showing a decrease in averaged channel transmission capacity when there is a signal level difference between received signals which are received by a plurality of antenna elements in a MIMO antenna apparatus according to the present preferred embodiment. The graph shows a decrease in averaged channel transmission capacity for the case in which, when there are two feeding antenna elements, the signal level (i.e., power) of the received signal which is received by one of the feeding antenna elements is reduced and accordingly the signal level difference occurs, for each signal-to-noise ratio (SNR) of 10, 20, 30, and 40 [dB]. According to the graph, it can be seen that when the signal level difference goes from 0 dB to 10 dB, the averaged channel transmission capacity is reduced to 80% of its original value. As an example, a MIMO adaptive control process will be described which is performed so as to reduce the signal level difference between received signals which are received by the feeding antenna elements 1*a*, 1*b*, and 1*c*, when the signal level difference is 10 dB.

Figure 8:
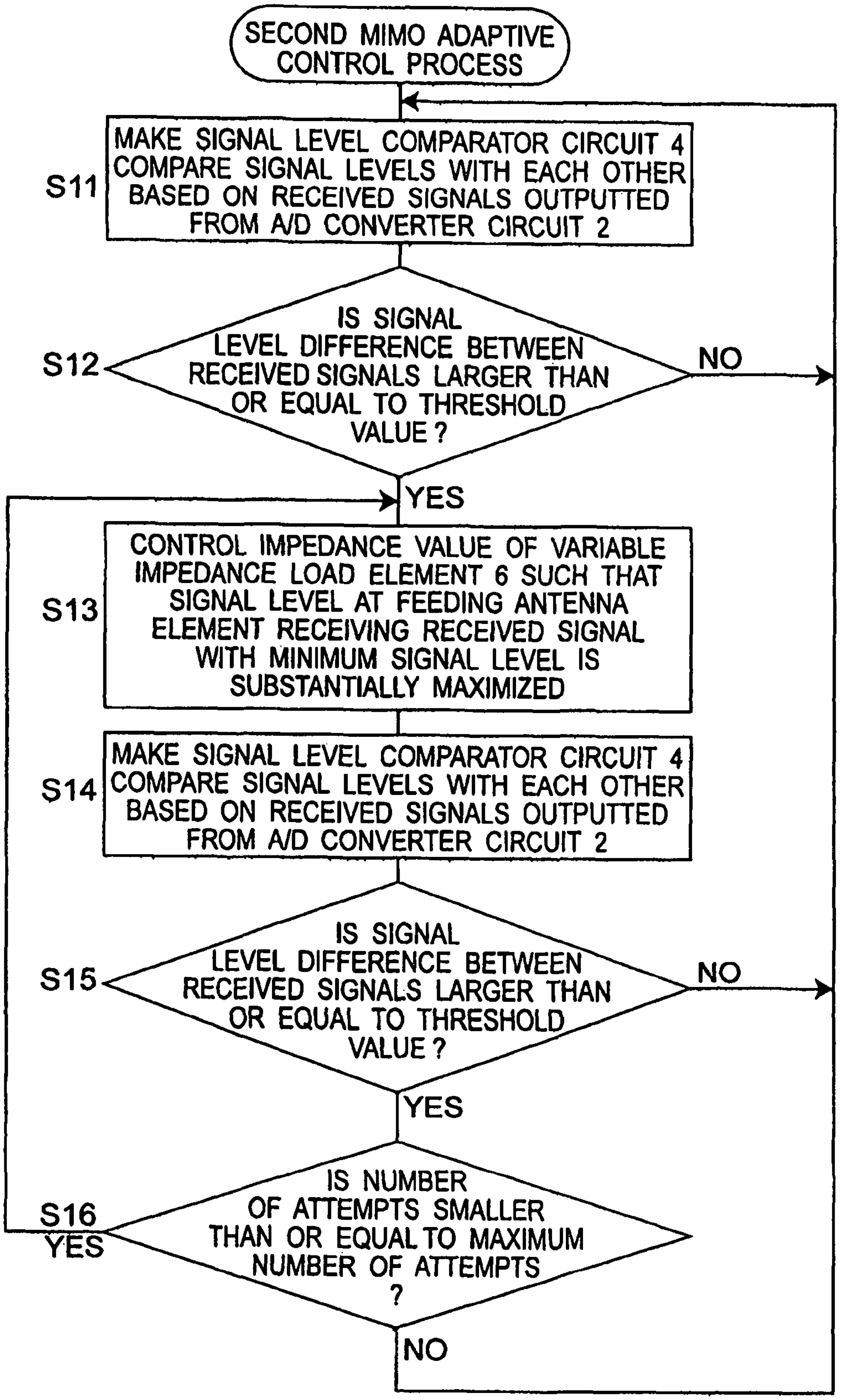
FIG. 8 is a flowchart showing a second MIMO adaptive control process which is performed by the controller 5 of FIG. 1.

FIG. 8 is a flowchart showing a second MIMO adaptive control process which is performed by the controller 5. In step S11 of FIG. 8, the controller 5 makes the signal level comparator circuit 4 compare signal levels the received signals with each other based on the received signals outputted from the A/D converter circuit 2, and obtains information on a comparison result from the signal level comparator circuit 4. Here, the comparison of the signal levels is performed by determining whether the signal level difference between the received signal having the maximum signal level and the received signal having the minimum signal level is larger than or equal to a predetermined threshold value. The threshold value of the signal level difference is set, for example, to 10 dB, as described above. In step S12, if the signal level difference is larger than or equal to the threshold value, then the controller 5 proceeds to step S13; otherwise, then the controller 5 returns to step S11 and makes the MIMO demodulator circuit 3 continue the normal demodulation process. In step S13, the controller 5 controls the impedance value of the variable impedance load element 6 such that the signal level of the received signal at the feeding antenna element receiving the received signal having the minimum signal level is substantially maximized. After controlling the impedance value of the variable impedance load element 6, in step S14, as with the processing in step S11, the controller 5 makes the signal level comparator circuit 4 again compare signal levels with signals each other based on the received signals outputted from the A/D converter circuit 2, and obtains information on a comparison result from the signal level comparator circuit 4. In step S15, if the signal level difference between the received signal having the maximum signal level and the received signal having the minimum signal level is larger than or equal to the threshold value used in step S12, the controller 5 proceeds to step S16; otherwise, the controller 5 returns to step S11 and makes the MIMO demodulator circuit 3 continue the normal demodulation process. In step S16, the controller 5 determines whether the number of attempts to control the impedance value (i.e., the number of times that step S13 is performed) is smaller than or equal to the maximum number of attempts. If "YES" in step S16 then the controller 5 returns to step S13, and if "NO" then the controller 5 returns to step S11 and makes the MIMO demodulator circuit 3 continue the normal demodulation process.

The second MIMO adaptive control process is suitable for controlling the impedance value of the variable impedance load element 6 to achieve communication with higher sensitivity, higher speed, and higher quality, when the signal levels of the respective received signals are high (i.e., when the respective signal levels exceed the threshold value in the first MIMO adaptive control process). This is caused by, referring to the singular value decomposition of the equation (2), the fact that the smaller the signal level difference between received signals at the feeding antenna elements 1*a*, 1*b*, and 1*c* becomes, the larger the calculated eigenvalue becomes, and thus the channel transmission capacity increases further.

Next, a process will be described which is performed when the signal level of the respective received signals are very low, such as when the signal levels of all received signals are smaller than the threshold value in step S2 of FIG. 7.

Figure 9:
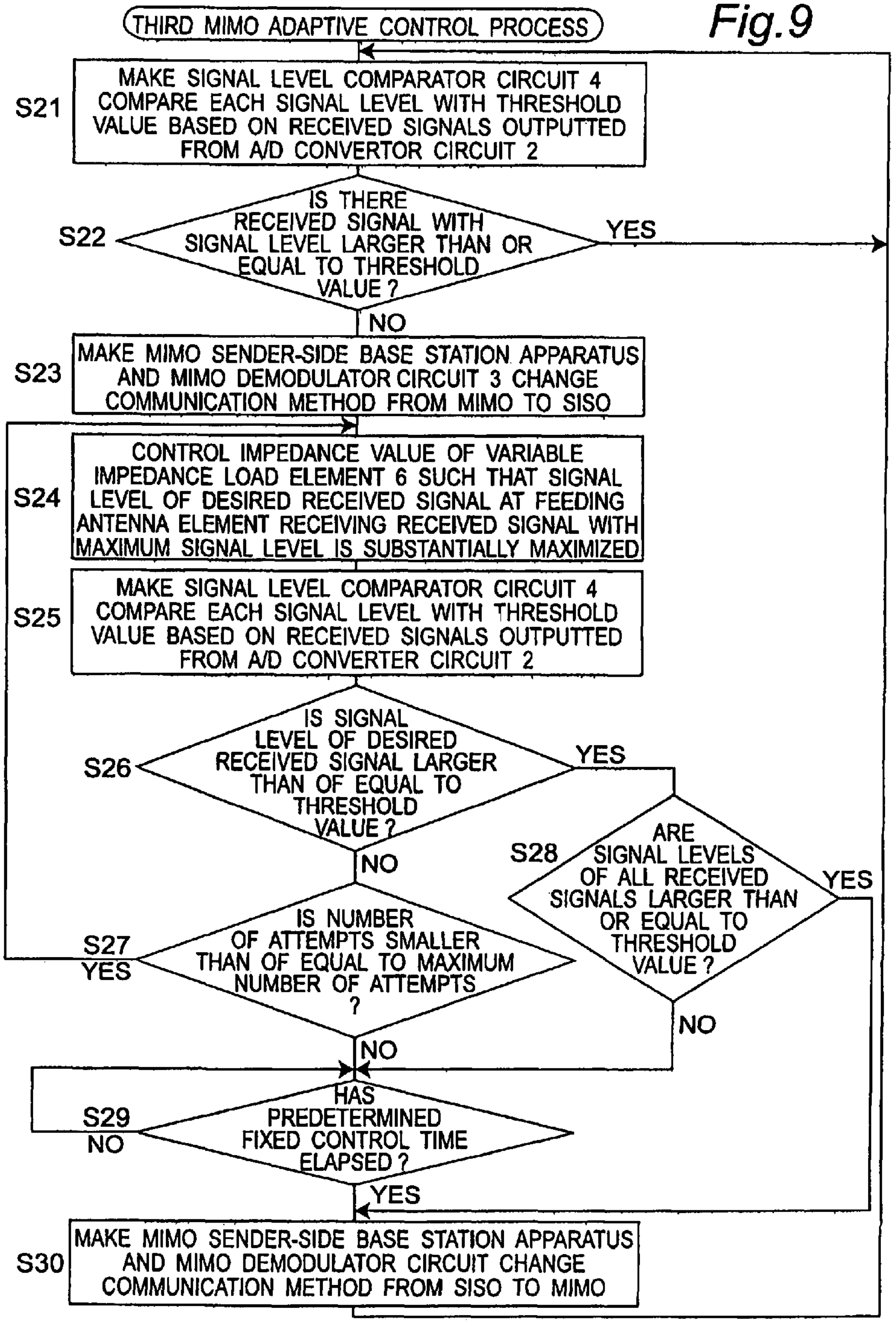
FIG. 9 is a flowchart showing a third MIMO adaptive control process which is performed by the controller 5 of FIG. 1.

FIG. 9 is a flowchart showing a third MIMO adaptive control process which is performed by the controller 5. In this process, when the signal levels of received signals are very low and the signal levels of all of the received signals are smaller than a threshold value, a variable impedance load is controlled such that the signal level of only the received signal having the maximum signal level is substantially maximized. In such a way, although MIMO communication can not be performed, a wireless communication channel is ensured by maintaining the signal level enough to enable SISO communication.

In step S21 of FIG. 9, the controller 5 makes the signal level comparator circuit 4 compare the signal level of each received signal with a threshold value based on the received signals outputted from the A/D converter circuit 2, and obtains information on comparison results from the signal level comparator circuit 4. Here, the threshold value of the signal level is the same as that used in step S1 of FIG. 7. The signal level comparator circuit 4 compares each received signal level with the threshold value, and if the received signal levels of all wireless signals are smaller than the first threshold value, the signal level comparator circuit 4 detects the maximum received signal level. In step S22, if there is a received signal having a signal level larger than or equal to the threshold value, the controller 5 returns to step S21 and makes the MIMO demodulator circuit 3 continue the normal demodulation process; otherwise, the controller 5 proceeds to step S23. In following steps S23 to S27, the signal level of only the received signal (hereinafter, referred to as a "desired received signal") at the feeding antenna element receiving the received signal having the maximum signal level among the received signals compared in step S21 is controlled so as to be substantially maximized, and SISO communication is performed using the desired received signal. In step S23, the controller 5 makes the MIMO sender-side base station apparatus and the MIMO demodulator circuit 3 change their communication methods from a MIMO method to a SISO method. That is, the controller 5 transmits, through the wireless transmitter circuit 8 and the transmitting antenna element 9 connected to the wireless transmitter circuit 8, a control signal requesting the MIMO sender-side base station apparatus to change a modulation method used by the MIMO sender-side base station apparatus from the MIMO method to the SISO method, and the controller 5 also changes a demodulation method used by the MIMO demodulator circuit 3 from the MIMO method to the SISO method. When the MIMO demodulator circuit 3 operates by using the SISO method, the MIMO demodulator circuit 3 demodulates only a desired received signal. In step S24, the controller 5 controls the impedance value of the variable impedance load element 6 such that the signal level of the desired received signal is substantially maximized. After controlling the impedance value of the variable impedance load element 6, in step S25, the controller 5 makes the signal level comparator circuit 4 compare each signal level with the threshold value used in step S21 based on the received signals outputted from the A/D converter circuit 2, and obtains information on comparison results from the signal level comparator circuit 4. In step S26, if the signal level of the desired received signal has become larger than or equal to the threshold value by the control of the impedance value of the variable impedance load element 6 in step S24, then the controller 5 proceeds to step S28; otherwise, then the controller 5 proceeds to step S27. In step S27, the controller 5 determines whether the number of attempts to control the impedance value (i.e., the number of times that step S24 is performed) is smaller than or equal to the maximum number of attempts. If "YES" in step S27 then the controller 5 returns to step S24, and if "NO" then the controller 5 returns to step S29. In step S28, the controller 5 determines, based on the comparison results obtained in step S25, whether the signal levels of all of the received signals have become larger than or equal to the threshold value used in step S21 by the control of the impedance value of the variable impedance load element 6 in step S24. If "YES" in step S28 then the controller 5 proceeds to step S30, and if "NO" then the controller 5 proceeds to step S29. In step S29, the controller 5 makes the MIMO demodulator circuit 3 continue a demodulation process for the desired received signal until a predetermined fixed control time has elapsed by referring to an internal timer (not shown), and when the fixed control time has elapsed, the controller 5 proceeds to step S30. In step S30, the controller 5 transmits, through the wireless transmitter circuit 8 and the transmitting antenna element 9 connected to the wireless transmitter circuit 8, a control signal requesting the MIMO sender-side base station apparatus to change the modulation method used by the MIMO sender-side base station apparatus from the SISO method to the MIMO method, and the controller 5 also changes the demodulation method used by the MIMO demodulator circuit 3 from the SISO method to the MIMO method, and then returns to step S21.

It is also possible to perform a process in which the above-described first to third MIMO adaptive control processes are combined. FIGS. 10 to 13 are flowcharts showing a fourth MIMO adaptive control process which is performed by the controller 5.

Figure 10:
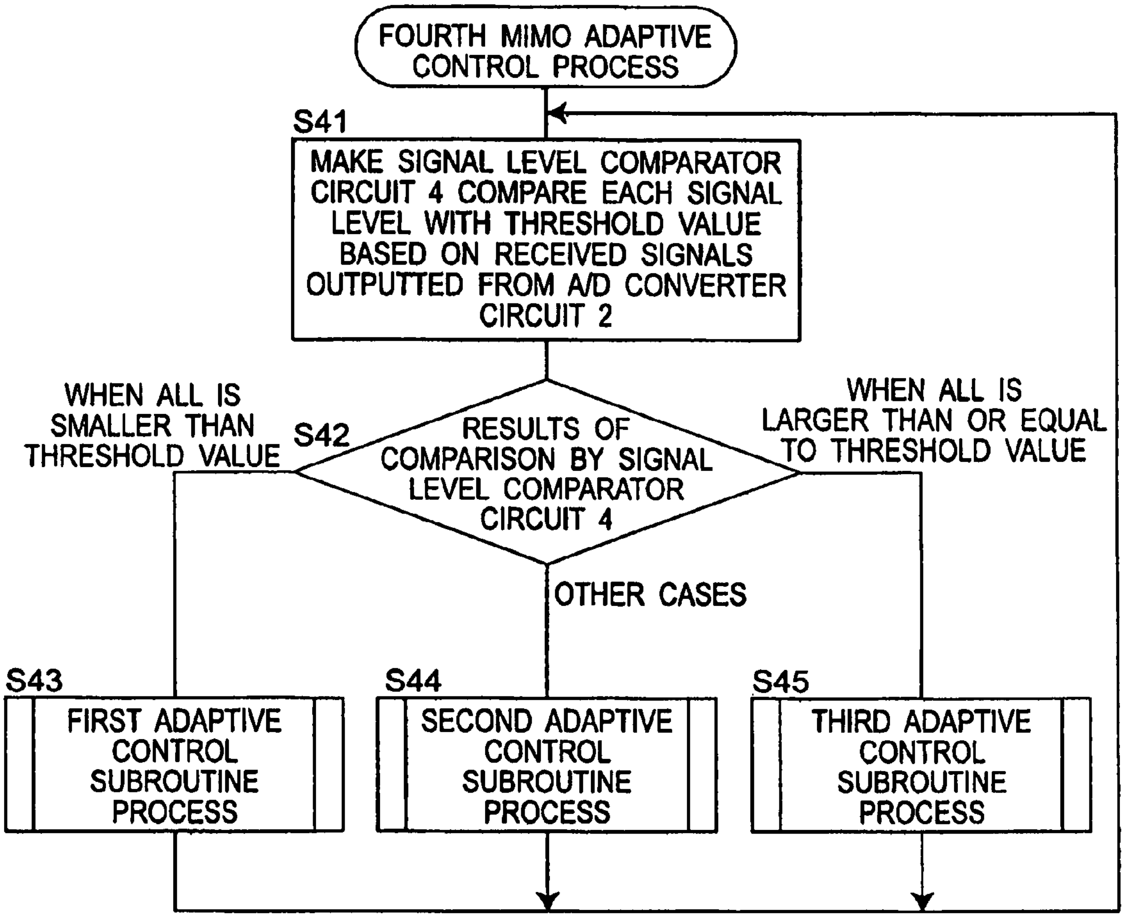
FIG. 10 is a flowchart showing a fourth MIMO adaptive control process which is performed by the controller 5 of FIG. 1.

In step S41 of FIG. 10, as with step S1 of FIG. 7, the controller 5 makes the signal level comparator circuit 4 compare the signal level of each received signal with a threshold value based on the received signals outputted from the A/D converter circuit 2, and obtains information on comparison results from the signal level comparator circuit 4. Here, the threshold value of the signal level is, for example, the same as that used in step S1 of FIG. 7. In step S42, if the signal levels of all of the received signals are smaller than the threshold value, the controller 5 proceeds to a first adaptive control subroutine process in step S43; if the signal levels of all of the received signals are larger than or equal to the threshold value, the controller 5 proceeds to a third adaptive control subroutine process in step S45; and for other cases (i.e., if the signal levels of some received signals are larger than or equal to the threshold value and the signal levels of some received signals are smaller than the threshold value), the controller 5 proceeds to a second adaptive control subroutine process in step S44.

Figure 11:
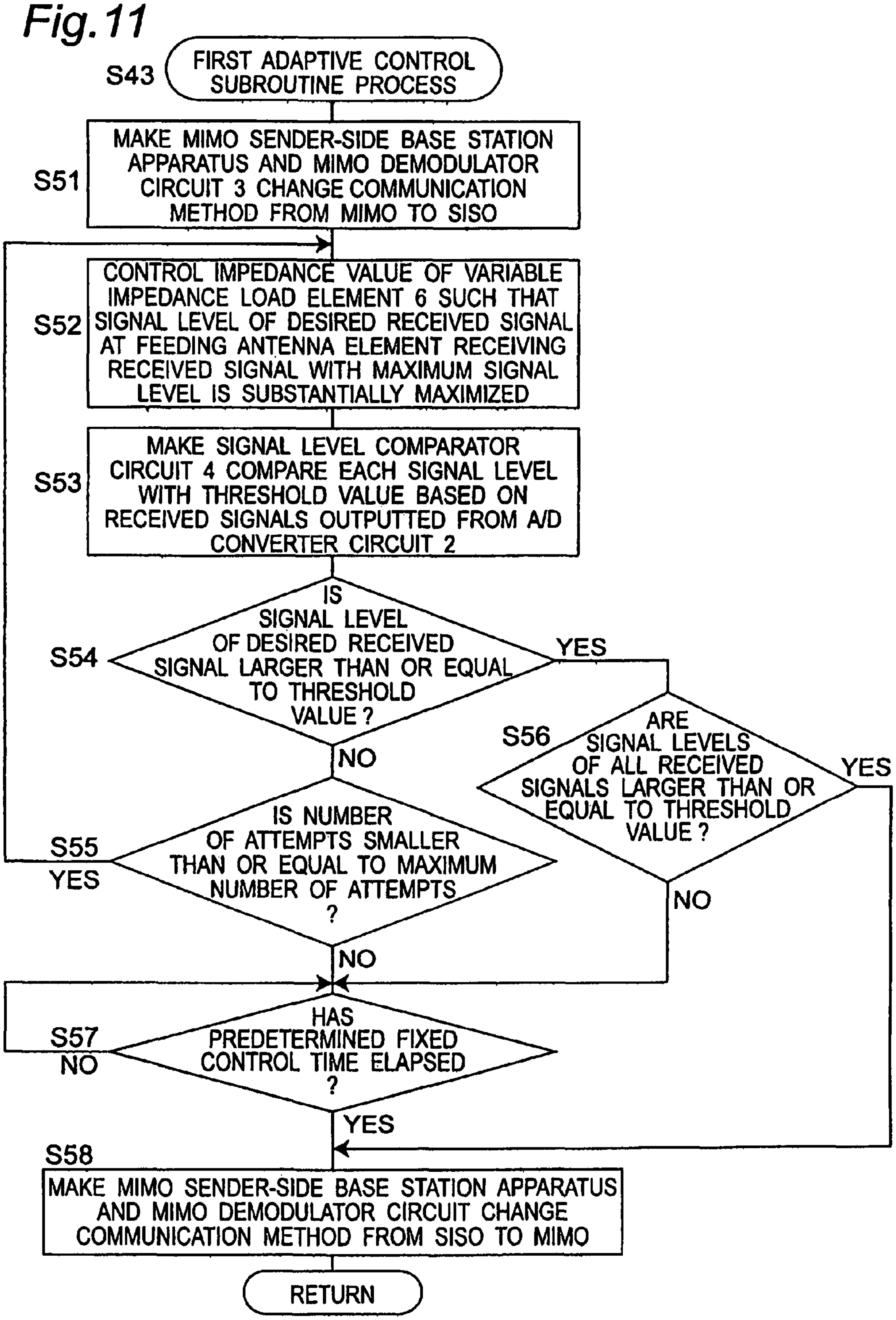
FIG. 11 is a flowchart showing a first adaptive control subroutine process in step S43 of FIG. 10.

FIG. 11 is a flowchart showing the first adaptive control subroutine process in step S43 of FIG. 10. Steps S51 to S58 of FIG. 11 are the same as steps S23 to S30 of FIG. 9. After performing S58, the controller 5 returns to step S41 of FIG. 10.

Figure 12:
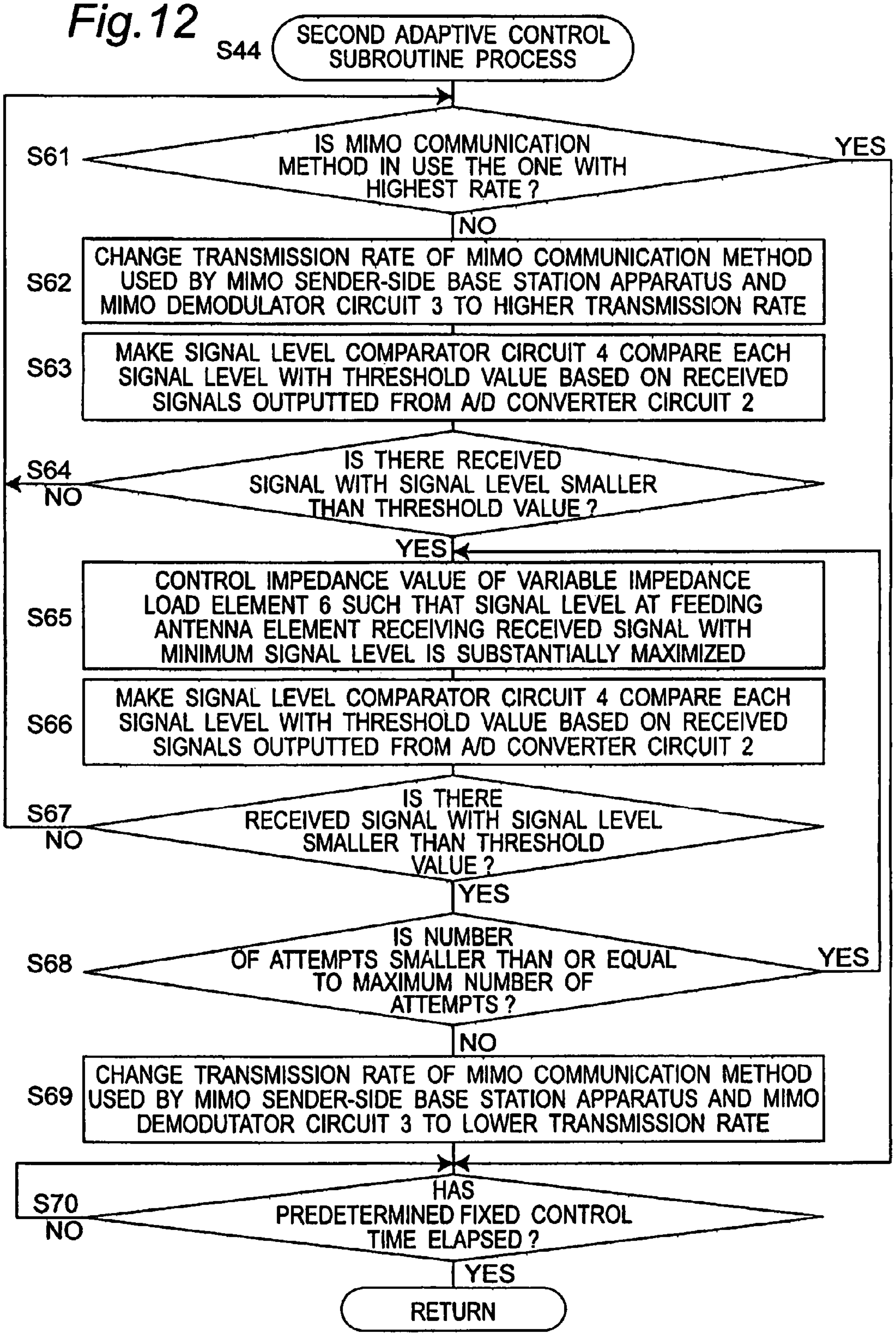
FIG. 12 is a flowchart showing a second adaptive control subroutine process in step S44 of FIG. 10.

FIG. 12 is a flowchart showing the second adaptive control subroutine process in step S44 of FIG. 10. In the MIMO adaptive control process of FIGS. 10 to 13, it is assumed that the MIMO sender-side base station apparatus and the MIMO antenna apparatus can perform a MIMO communication method with a plurality of transmission rates. In step S61, the controller 5 determines whether the transmission rate of a MIMO communication method in use by the MIMO sender-side base station apparatus and the MIMO modulation circuit 3 is the highest transmission rate available to the MIMO sender-side base station apparatus and the MIMO modulation circuit 3. If "YES" in step S61 then the controller 5 proceeds to step S70, and if "NO" then the controller 5 proceeds to step S62. In step S62, the controller 5 transmits, through the wireless transmitter circuit 8 and the transmitting antenna element 9 connected to the wireless transmitter circuit 8, a control signal requesting the MIMO sender-side base station apparatus to change the transmission rate of a modulation method used by the MIMO sender-side base station apparatus to a higher transmission rate, and the controller 5 also changes the transmission rate of a demodulation method used by the MIMO demodulator circuit 3 to a corresponding higher transmission rate of the MIMO communication method. Subsequent steps S63 to S68 are the same as steps S1 to S6 of FIG. 7, however, if it is determined in steps S64 or S67 that there is no received signal having the signal level smaller than the threshold value, then the controller 5 returns to step S61 and attempts again to increase the rate of the MIMO communication method. If it is determined in step S68 that the number of attempts to control the impedance value (i.e., the number of times that step S65 is performed) is larger than the maximum number of attempts, then the controller 5 determines that the increase in the rate of the MIMO communication method in step S62 is inappropriate, and proceeds to step S69. In step S69, the controller 5 transmits, through the wireless transmitter circuit 8 and the transmitting antenna element 9 connected to the wireless transmitter circuit 8, a control signal requesting the MIMO sender-side base station apparatus to change the transmission rate of the modulation method used by the MIMO sender-side base station apparatus to a lower transmission rate, and the controller 5 also changes the transmission rate of the demodulation method used by the MIMO demodulator circuit 3 to a corresponding lower transmission rate of the MIMO communication method. After performing step S69, the controller 5 proceeds to step S70 and makes the MIMO demodulator circuit 3 continue the normal demodulation process until a predetermined fixed control time has elapsed. When the fixed control time has elapsed, then the controller 5 returns to step S41 of FIG. 10.

Figure 13:
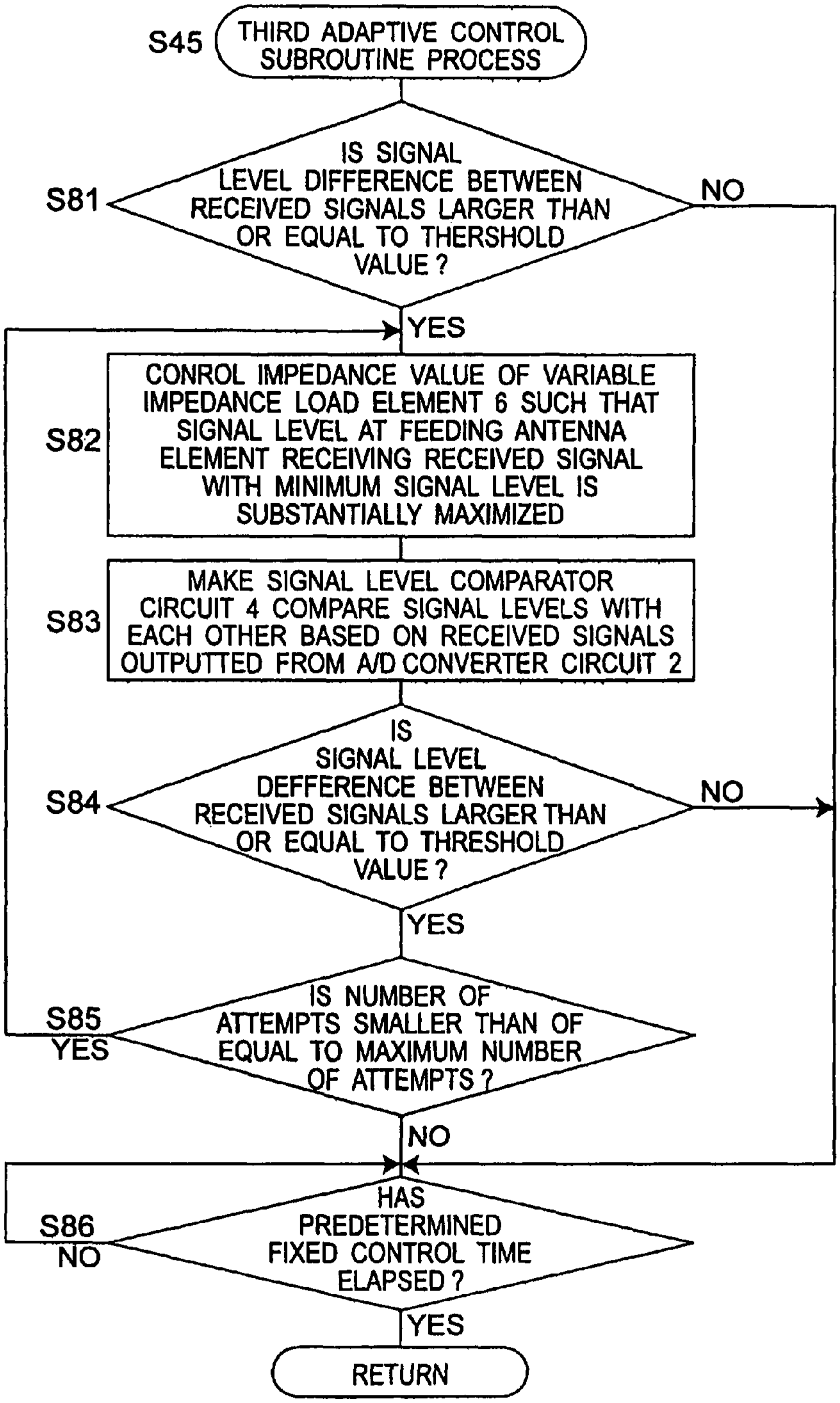
FIG. 13 is a flowchart showing a third adaptive control subroutine process in step S45 of FIG. 10.

FIG. 13 is a flowchart showing the third adaptive control subroutine process in step S45 of FIG. 10. Steps S81 to S85 of FIG. 13 are the same as steps S12 to S16 of FIG. 8. If "NO" in steps S81, S84, or S85, then the controller 5 proceeds to step S86 and makes the MIMO demodulator circuit 3 continue the normal demodulation process until a predetermined fixed control time has elapsed. When the fixed control time has elapsed, then the controller 5 returns to step S41 of FIG. 10.

According to the above-described fourth MIMO adaptive control process, when the signal levels of all received signals which are received by the feeding antenna elements 1*a*, 1*b*, and 1*c* are sufficiently larger than the signal level enough to perform MIMO communication (e.g., the signal level corresponding to an error-free threshold value which is dependent on a MIMO communication method), the second MIMO adaptive control process is performed. This is because a MIMO wireless communication with higher quality can be achieved by reducing the signal level difference between received signals. When there is the feeding antenna element that provides the received signal having the signal level smaller than a threshold value, the first MIMO adaptive control process is performed. When the signal levels of the received signals are very low and the signal levels of all of the received signals are smaller than the threshold value, the third MIMO adaptive control process is performed. Accordingly, the best wireless communication can be always performed by selecting optimal control depending on the signal levels of the received signals.

According to the MIMO antenna apparatus of the present preferred embodiment, specific advantageous effects such as those described below are provided.

In particular, in the case of mobile communication, there would be the temporal changes in principal-polarization characteristics or polarization characteristics due to the movement of a user and the temporal change in surrounding environment. Additionally, in the case of a portable terminal apparatus, there would be the changes in the directivity and polarization direction of an antenna apparatus in use due to various conditions in which the antenna apparatus is held by hand(s). In order to cope with these changes, directivity control such as that in the present preferred embodiment is preferred. In addition, although received signal power of a portable terminal apparatus may be significantly reduced by covering a feeding point with a user's hand, such reduction in the received signal power can be overcome by adopting the configuration of the present preferred embodiment.

Furthermore, according to the MIMO antenna apparatus of the present preferred embodiment, a MIMO antenna apparatus with high sensitivity can be implemented without increasing the number of feeding antenna elements. In General, a MIMO antenna apparatus requires individual wireless communication circuits each operating in relation to each of feeding antenna elements. Namely, if the number of feeding antenna elements is increased in order to improve the gain of a MIMO antenna apparatus, then the number of wireless communication circuits is increased and thus the circuit size increases, as well as the power consumption may also increase. In this case, in a portable wireless communication apparatus that operates by a rechargeable battery, particularly, including a mobile phone, possible talk-time is shortened due to the increase in power consumption. On the other hand, the MIMO antenna apparatus of the present preferred embodiment is configured to control the directivity by means of the parasitic element without increasing the number of feeding antenna elements, and accordingly, there is an advantage that while transmission capacity and transmission quality are improved by an improvement in gain, low power consumption and a small-sized configuration can be achieved.

Moreover, according to the MIMO antenna apparatus of the present preferred embodiment, the threshold value of the signal level necessary to achieve a desired total transmission rate of a plurality of signal sequences after MIMO demodulation is preset in order to make the control fast and simple. Then, when the signal level of a received signal which is received by any of feeding antenna elements is smaller than or equal to the threshold value, the impedance value of the variable impedance load element 6 is changed such that the signal level at the feeding antenna element smaller than or equal to the threshold value is larger than or equal to the threshold value. Accordingly, the control can be faster, and also it is effective to reduce the power consumption because the control does not need to be performed all the time. Such reduction in the power consumption is highly effective particularly in battery-driven portable wireless communication apparatuses.

According to the present preferred embodiment, maximum MIMO wireless transmission characteristics can be achieved due to the effects of an increase in the sensitivity of feeding antenna elements and a reduction in signal level difference.

In a further modified preferred embodiment, the MIMO antenna apparatus of the present preferred embodiment is adopted in a wireless communication system in which the controller 5 notifies the sender-side base station apparatus of the received signal level, and in which a modulation method of the wireless signal to be transmitted is adaptively changed. In this case, the notification about the received signal level having been increased by performing the MIMO adaptive control process of FIG. 7 or the like is provided to the sender-side base station apparatus. Accordingly, there is an advantage of enabling a transmission and reception by a modulation method with a higher modulation rate, making it possible to implement high-speed wireless communication.

Second Preferred Embodiment

Figure 15:
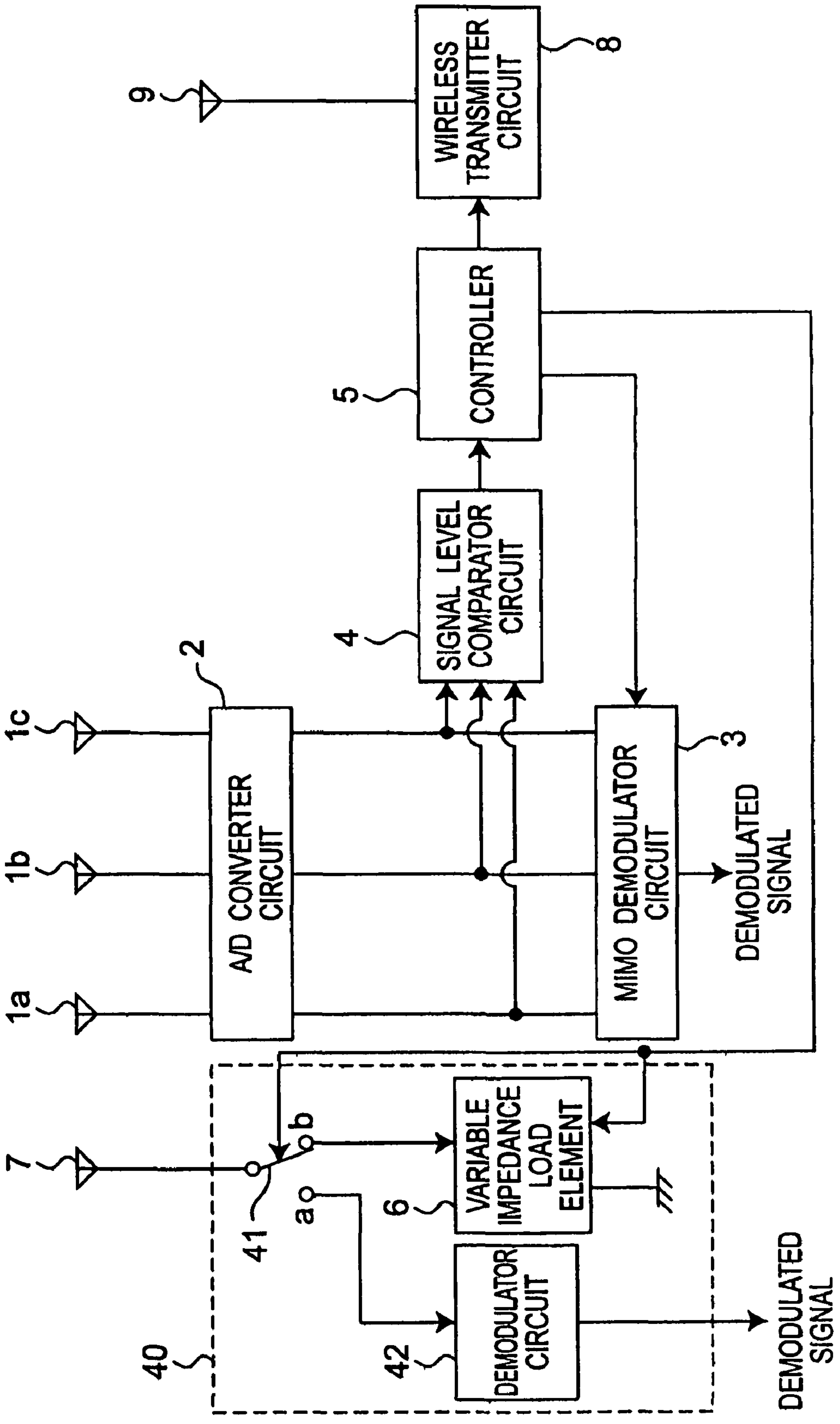
FIG. 15 is a block diagram showing a configuration of a MIMO antenna apparatus according to a second preferred embodiment of the present invention.

FIG. 15 is a block diagram showing a configuration of a MIMO antenna apparatus according to a second preferred embodiment of the present invention. The MIMO antenna apparatus of the present preferred embodiment is characterized in including a parasitic element control circuit 40 in place of the variable impedance load element 6 of FIG. 1. The parasitic element control circuit 40 includes therein a plurality of circuits and/or elements provided for different purposes, and connects either one of the circuits and/or elements to a parasitic element 7. In the present embodiment, the parasitic element control circuit 40 includes: a variable impedance load element 6 which is the same as that of FIG. 1; a demodulator circuit 42 for demodulating a wireless signal received through the parasitic element 7; and a switch 41 that connects one of the variable impedance load element 6 and the demodulator circuit 42 to the parasitic element 7. The switch 41 operates under the control of the controller 5. When the parasitic element 7 is connected to the variable impedance load element 6, the controller 5 controls the impedance value of the variable impedance load element 6, and thus the parasitic element 7 is used to control the directivity of feeding antenna elements 1*a*, 1*b*, and 1*c*, as in the case of the first preferred embodiment. On the other hand, when the parasitic element 7 is connected to the demodulator circuit 42, the parasitic element 7 operates as a different receiving antenna element separate from the feeding antenna elements 1*a*, 1*b*, and 1*c*, and the parasitic element 7 and the demodulator circuit 42 process communication different from voice communication and/or data communication which are(is) demodulated by the MIMO demodulator circuit 3. The demodulator circuit 42 is a demodulator circuit for e.g., television broadcasting, or alternatively, other wireless communication circuits for performing transmission and/or reception of other wireless signals may be provided. The switch 41 may be changed manually by a user of the MIMO antenna apparatus instead of by the controller 5.

According to the configuration shown in FIG. 15, by using the parasitic element 7 to change its operation between (1) controlling the directivity of the feeding antenna elements 1*a*, 1*b*, and 1*c* and (2) receiving a wireless signal for demodulating the wireless signal in the demodulator circuit 42, a wireless communication apparatus can be implemented which can efficiently perform adaptive control in a small mobile terminal.

The above-described MIMO antenna apparatus according to the second preferred embodiment can also be implemented as the portable wireless communication apparatuses shown in FIGS. 5 and 6.

As described above, according to the MIMO antenna apparatuses according to the preferred embodiments of the present invention, a MIMO antenna apparatus can be implemented so as to improve the sensitivity by means of a configuration for changing the impedance value of a variable impedance load element 6 connected to a parasitic element 7 electromagnetically coupled to the plurality of feeding antenna elements 1*a*, 1*b*, and 1*c*, and to enable a faster control by performing the control using a predetermined threshold value.

As described above, according to the configuration of the present preferred embodiment, a MIMO antenna apparatus can be implemented which can achieve higher transmission capacity using fewer number of antenna elements, in a portable wireless communication apparatus for which a small-sized configuration is preferred.

Although, as described above, the present invention is described in detail using preferred embodiments, the present invention is not limited thereto. It will be obvious to those skilled in the art that numerous modified preferred embodiments and altered preferred embodiments are possible within the technical scope of the present invention as defined in the following appended claims.

What is claimed is:

1. A MIMO antenna apparatus comprising:

a plurality of feeding antenna elements for respectively receiving a plurality of wireless signals;

a demodulator for demodulating the wireless signals received by the plurality of feeding antenna elements, by a MIMO (Multi-Input Multi-Output) method;

at least one parasitic element provided to be electromagnetically coupled to each of the feeding antenna elements;

at least one variable impedance load element connected to the parasitic element;

a comparator for detecting a received signal level of each of the wireless signals received by the feeding antenna elements and comparing the received signal levels with each other, thereby detecting the minimum received signal level; and a controller for controlling an impedance value of the variable impedance load element based on the received signal levels detected by the comparator, such that the received signal level of the wireless signal having the minimum received signal level is substantially maximized.

2. The MIMO antenna apparatus as claimed in claim 1, wherein the comparator further detects the received signal level smaller than a predetermined first threshold value, and wherein the controller further controls the impedance value of the variable impedance load element based on the received signal levels detected by the comparator, such that the received signal level of the wireless signal having the minimum received signal level among wireless signals having the detected received signal level smaller than the first threshold value is substantially maximized.

3. The MIMO antenna apparatus as claimed in claim 1, wherein the comparator further compares the received signal level of each of the wireless signals with a predetermined first threshold value, and when the received signal levels of all of the wireless signals are larger than or equal to the first threshold value, the comparator compares a signal level difference between the maximum received signal level and the minimum received signal level with a predetermined second threshold value, and wherein, when the signal level difference is larger than or equal to the second threshold value, the controller further controls the impedance value of the variable impedance load element based on the received signal levels detected by the comparator, such that the received signal level of the wireless signal having the minimum received signal level is substantially maximized.

4. The MIMO antenna apparatus as claimed in claim 1, further comprising a wireless transmitter for wirelessly transmitting a control signal to a sender-side wireless station apparatus which transmits the plurality of wireless signals, the control signal controlling a communication method used by the sender-side wireless station apparatus, wherein the comparator further compares the received signal level of each of the wireless signals with a predetermined first threshold value, and when the received signal levels of all of the wireless signals are smaller than the first threshold value, the comparator detects the maximum received signal level, and wherein, when the received signal levels of all of the wireless signals are smaller than the first threshold value, the controller further:

(i) controls the sender-side wireless station apparatus by making the wireless transmitter transmit the control signal and controls the MIMO demodulator, so as to change communication method used by each of the sender-side wireless station apparatus and the MIMO demodulator from a MIMO method to a SISO (Single-Input Single-Output) method; and (ii) controls the impedance value of the variable impedance load element based on the received signal level detected by the comparator, such that the received signal level of the wireless signal having the maximum received signal level is substantially maximized.

5. The MIMO antenna apparatus as claimed in claim 1, further comprising a wireless transmitter for wirelessly transmitting a control signal to a sender-side wireless station apparatus which transmits the plurality of wireless signals, the control signal controlling a communication method used by the sender-side wireless station apparatus, wherein the comparator further compares the received signal level of each of the wireless signals with a predetermined first threshold value, and when the received signal levels of all of the wireless signals are larger than or equal to the first threshold value, the comparator compares a signal level difference between the maximum received signal level and the minimum received signal level with a predetermined second threshold value, and when the received signal levels of all of the wireless signals are smaller than the first threshold value, the comparator detects the maximum received signal level, and wherein, (a) when the received signal level of at least one wireless signal is smaller than the first threshold value and the received signal level of at least one wireless signal is larger than or equal to the first threshold value, the controller further controls the impedance value of the variable impedance load element based on the received signal levels detected by the comparator, such that the received signal level of the wireless signal having the minimum received signal level among wireless signals having the detected received signal level smaller than the first threshold value is substantially maximized, (b) when the received signal levels of all of the wireless signals are larger than or equal to the first threshold value and the signal level difference between the maximum received signal level and the minimum received signal level is larger than or equal to the second threshold value, the controller further controls the impedance value of the variable impedance load element based on the received signal levels detected by the comparator, such that the received signal level of the wireless signal having the minimum received signal level is substantially maximized, and (c) when the received signal levels of all of the wireless signals are smaller than the first threshold value, the controller further:

(i) controls the sender-side wireless station apparatus by making the wireless transmitter transmit the control signal and controls the MIMO demodulator, so as to change communication method used by each of the sender-side wireless station apparatus and the MIMO demodulator from a MIMO method to a SISO method; and (ii) controls the impedance value of the variable impedance load element based on the received signal level detected by the comparator, such that the received signal level of the wireless signal having the maximum received signal level is substantially maximized.

6. The MIMO antenna apparatus as claimed in claim 4, wherein in the case that the communication method used by each of the sender-side wireless station apparatus and the MIMO demodulator are changed from the MIMO method to the SISO method, (a) when the received signal levels of all of the wireless signals have become larger than or equal to the first threshold value by controlling the impedance value of the variable impedance load element, or (b) when a predetermined fixed control time has elapsed, the controller further controls the sender-side wireless station apparatus by making the wireless transmitter transmit the control signal and controls the MIMO demodulator, so as to change the communication method used by each of the sender-side wireless station apparatus and the MIMO demodulator from the SISO method to the MIMO method.

7. The MIMO antenna apparatus as claimed in claim 5, wherein in the case that the communication method used by each of the sender-side wireless station apparatus and the MIMO demodulator are changed from the MIMO method to the SISO method, (a) when the received signal levels of all of the wireless signals have become larger than or equal to the first threshold value by controlling the impedance value of the variable impedance load element, or (b) when a predetermined fixed control time has elapsed, the controller further controls the sender-side wireless station apparatus by making the wireless transmitter transmit the control signal and controls the MIMO demodulator, so as to change the communication method used by each of the sender-side wireless station apparatus and the MIMO demodulator from the SISO method to the MIMO method.

8. The MIMO antenna apparatus as claimed in claim 1, wherein the variable impedance load element has an impedance value which continuously changes according to control of the controller.

9. The MIMO antenna apparatus as claimed in claim 1, wherein the variable impedance load element has a plurality of impedance values which are selectively changed according to control of the controller.

10. The MIMO antenna apparatus as claimed in claim 1, further comprising:

a wireless communication circuit for receiving or transmitting a certain wireless signal; and a switch for connecting either one of the variable impedance load element and the wireless communication circuit to the parasitic element.

11. A wireless communication apparatus comprising a MIMO antenna apparatus, the MIMO antenna apparatus including:

a plurality of feeding antenna elements for respectively receiving a plurality of wireless signals;

a demodulator for demodulating the wireless signals received by the plurality of feeding antenna elements, by a MIMO method;

at least one parasitic element provided to be electromagnetically coupled to each of the feeding antenna elements;

at least one variable impedance load element connected to the parasitic element;

a comparator for detecting the received signal level of each of the wireless signals received by the feeding antenna elements and comparing the received signal levels with each other, thereby detecting the minimum received signal level; and a controller for controlling an impedance value of the variable impedance load element based on the received signal levels detected by the comparator, such that the received signal level of the wireless signal having the minimum received signal level is substantially maximized.

* * * * *